(12) United States Patent
Johansen et al.

(10) Patent No.: US 12,235,790 B2
(45) Date of Patent: Feb. 25, 2025

(54) DEEP NEURAL NETWORK-BASED DECISION NETWORK

(71) Applicant: salesforce.com, inc., San Francisco, CA (US)

(72) Inventors: Alexander Rosenberg Johansen, San Francisco, CA (US); Bryan McCann, San Francisco, CA (US); James Bradbury, San Francisco, CA (US); Richard Socher, Menlo Park, CA (US)

(73) Assignee: Salesforce, Inc., San Francisco, CA (US)

( * ) Notice: Subject to any disclaimer, the term of this patent is extended or adjusted under 35 U.S.C. 154(b) by 478 days.

(21) Appl. No.: 17/670,368

(22) Filed: Feb. 11, 2022

(65) Prior Publication Data

US 2022/0164635 A1 May 26, 2022

Related U.S. Application Data

(63) Continuation of application No. 15/853,570, filed on Dec. 22, 2017, now Pat. No. 11,250,311.
(Continued)

(51) Int. Cl.
*G06N 20/00* (2019.01)
*G06F 15/76* (2006.01)
(Continued)

(52) U.S. Cl.
CPC ............ *G06F 15/76* (2013.01); *G06F 18/217* (2023.01); *G06F 18/24* (2023.01); *G06F 18/241* (2023.01);
(Continued)

(58) Field of Classification Search
CPC ........... G06N 20/00; G06N 3/045; G06N 5/04
See application file for complete search history.

(56) References Cited

U.S. PATENT DOCUMENTS 8,121,367 B2 2/2012 Socher et al.
8,355,550 B2 1/2013 Zhang et al.
(Continued)

FOREIGN PATENT DOCUMENTS

WO 2018/170175 A1 9/2018

OTHER PUBLICATIONS

Mahasseni et al., Budget-aware Deep Semantic, Jul. 26, 2017, IEEE Conference on Computer Vision and Pattern Recognition (pp. 1029-1038). (Year: 2017).*
(Continued)

*Primary Examiner* — Van C Mang
(74) *Attorney, Agent, or Firm* — Haynes and Boone, LLP

(57) ABSTRACT

The technology disclosed proposes using a combination of computationally cheap, less-accurate bag of words (BoW) model and computationally expensive, more-accurate long short-term memory (LSTM) model to perform natural processing tasks such as sentiment analysis. The use of cheap, less-accurate BoW model is referred to herein as "skimming". The use of expensive, more-accurate LSTM model is referred to herein as "reading". The technology disclosed presents a probability-based guider (PBG). PBG combines the use of BoW model and the LSTM model. PBG uses a probability thresholding strategy to determine, based on the results of the BoW model, whether to invoke the LSTM model for reliably classifying a sentence as positive or negative. The technology disclosed also presents a deep neural network-based decision network (DDN) that is trained to learn the relationship between the BoW model and the LSTM model and to invoke only one of the two models.

18 Claims, 23 Drawing Sheets

Related U.S. Application Data

(60) Provisional application No. 62/471,934, filed on Mar. 15, 2017.

(51) Int. Cl.

| | | |
|---|---|---|
| *G06F 18/21* | (2023.01) | |
| *G06F 18/24* | (2023.01) | |
| *G06F 18/241* | (2023.01) | |
| *G06F 18/2413* | (2023.01) | |
| *G06F 40/169* | (2020.01) | |
| *G06F 40/30* | (2020.01) | |
| *G06N 3/04* | (2023.01) | |
| *G06N 3/044* | (2023.01) | |
| *G06N 3/045* | (2023.01) | |
| *G06N 3/047* | (2023.01) | |
| *G06N 3/048* | (2023.01) | |
| *G06N 3/08* | (2023.01) | |
| *G06N 3/084* | (2023.01) | |
| *G06N 5/04* | (2023.01) | |
| *G06V 10/764* | (2022.01) | |
| *G06V 10/776* | (2022.01) | |
| *G06V 10/82* | (2022.01) | |

(52) U.S. Cl.
CPC ...... *G06F 18/24133* (2023.01); *G06F 40/169* (2020.01); *G06F 40/30* (2020.01); *G06N 3/044* (2023.01); *G06N 3/045* (2023.01); *G06N 3/047* (2023.01); *G06N 3/048* (2023.01); *G06N 3/084* (2013.01); *G06N 5/04* (2013.01); *G06N 20/00* (2019.01); *G06V 10/764* (2022.01); *G06V 10/776* (2022.01); *G06V 10/82* (2022.01)

(56) References Cited

U.S. PATENT DOCUMENTS

| | | | |
|---|---|---|---|
| 9,224,386 B1* | 12/2015 | Weber | G10L 15/08 |
| 9,436,895 B1 | 9/2016 | Jones et al. | |
| 9,489,630 B2* | 11/2016 | Achin | G06N 5/04 |
| 9,772,998 B2* | 9/2017 | Anisimovich | G06F 40/58 |
| 9,836,484 B1 | 12/2017 | Bialynicka-Birula et al. | |
| 10,282,663 B2 | 5/2019 | Socher et al. | |
| 10,346,721 B2 | 7/2019 | Albright et al. | |
| 2013/0018824 A1 | 1/2013 | Ghani et al. | |
| 2014/0156568 A1* | 6/2014 | Ganguly | G06Q 10/0637 706/12 |
| 2016/0350653 A1 | 12/2016 | Socher et al. | |
| 2017/0024645 A1 | 1/2017 | Socher et al. | |
| 2017/0032280 A1 | 2/2017 | Socher | |
| 2017/0052971 A1 | 2/2017 | Boyer et al. | |
| 2017/0140240 A1 | 5/2017 | Socher | |
| 2018/0032526 A1 | 2/2018 | Cudak et al. | |
| 2018/0082171 A1 | 3/2018 | Merity et al. | |
| 2018/0082197 A1 | 3/2018 | Aravamudan et al. | |
| 2018/0089553 A1 | 3/2018 | Liu et al. | |
| 2018/0096219 A1 | 4/2018 | Socher | |
| 2018/0121787 A1 | 5/2018 | Hashimoto et al. | |
| 2018/0121788 A1 | 5/2018 | Hashimoto et al. | |
| 2018/0121799 A1 | 5/2018 | Hashimoto et al. | |
| 2018/0129931 A1 | 5/2018 | Bradbury et al. | |
| 2018/0129937 A1 | 5/2018 | Bradbury et al. | |
| 2018/0129938 A1 | 5/2018 | Xiong et al. | |
| 2018/0143966 A1 | 5/2018 | Lu et al. | |
| 2018/0144208 A1 | 5/2018 | Lu et al. | |
| 2018/0144248 A1 | 5/2018 | Lu et al. | |
| 2018/0247636 A1 | 8/2018 | Arik et al. | |
| 2018/0268287 A1 | 9/2018 | Johansen et al. | |
| 2018/0268298 A1 | 9/2018 | Johansen et al. | |
| 2018/0300400 A1 | 10/2018 | Paulus | |
| 2019/0130896 A1 | 5/2019 | Zhou et al. | |

OTHER PUBLICATIONS

"Baluja et al., Adversarial Transformation Networks: Learning to Generate Adversarial Examples, Mar. 28, 2017, In International Conference on Computer Analysis of Images and Patterns (pp. 96-108)" (Year: 2017).*

"Windasari et al., Sentiment Analysis on Twitter Posts: An analysis of Positive or Negative Opinion on GoJek, Oct. 9, 2017, In 2017 4th international conference on information technology, computer, and electrical engineering (ICITACEE) (pp. 266-269). IEEE." (Year: 2017).*

"Arlot et al., A survey of cross-validation procedures for model selection, 2010, Statistics Surveys, vol. 4, pp. 40-79" (Year: 2010).*

"Vo et al., Multi-channel LSTM-CNN model for Vietnamese sentiment analysis, Oct. 2017, 2017 9th International Conference on Knowledge and Systems Engineering(KSE), pp. 24-29" (Year: 2017).*

"Sheikh et al., Learning Word Importance with the Neural-Bag-of-Words Model, 2016, In Proceedings of the 1st Workshop on Representation Learning for NLP (pp. 222-229)." (Year: 2016).*

"Dos Santos et al., Deep Convolutional Neural Networks for Sentiment Analysis of Short Texts, 2014, Proceedings of COLING 2014: Technical Papers, pp. 49-78" (Year: 2014).*

"Wang et al., Combination of Convolutional and Recurrent Neural Network Sentiment Analysis of Short Texts, 2016, Proceedings of COLING 2016: Technical Papers, pp. 2428-2437" (Year: 2016).*

"Bradbury et al., Quasi Recurrent Neural Networks, Nov. 5, 2016, arXiv preprint arXiv:1611.01576." (Year: 2016).*

"Kohavi et al., A study of cross-validation and bootstrap for accuracy estimation and model selection, 1995, I(nternational Joint Conference on Artificial Intelligence (IJCAI)" (Year: 1995).*

"Hockey et al., Comparison of Grammar-Based and Statistical Language Models trained on the Same Data, 2005, In Proceedings of the AAAI Workshop on Spoken Language Understanding" (Year: 2005).*

"Kucuktunc et al., A large-Scale Sentiment Analysis for Yahoo! Answers), 2012, In Proceedings of the fifth ACM international conference on Web search and data mining, pp. 633-642." (Year: 2012).*

"Nam et al., Learning Multi-Domain Convolutional Neural Networks for Visual Tracking, 2016, Proceedings of the IEEE conference on computer vision and pattern recognition" (Year: 2016).*

"Nogueira et al., Towards better exploiting convolutional neural networks for remote sensing scene classification, 2016, Pattern Recognition, vol. 61, pp. 539-556" (Year: 2016).*

"Yin et al., Comparative study of CNN and RNN for Natural Language Processing, Feb. 7, 2017, arXiv preprint arXiv:1702.01923." (Year: 2017).*

"Collobert et al., A unified architecture for natural language processing: deep neural networks with multitask learning, 2008, InProceedings of the 25th international conference on Machine learning Jul. 5, 2008 (pp. 160-167)." (Year: 2008).*

"Koo et al., Simple Semi-dependency parsing, 2008, Proceeding of ACL-08, pp. 595-603" (Year: 2008).*

"Deng et al., Machine Learning Paradigms for Speech Recognition: An Overview, 2013, IEEE Transactions on Audio, Speech, and Language Processing, 21(5), pp. 1060-1089." (Year: 2013).*

"Gambhir et al., Recent automatic text summarization techniques: a survey, Jan. 2017, Artificial Intelligence Review, 47(1), pp. 1-66." (Year: 2017).*

"Andreas et al., Learning to Compose Neural Networks for Question Answering, 2016, arXiv preprint arXiv:1601.01705" (Year: 2016).*

"You et al., Image captioning with semantic attention, 2016, In Proceedings of the IEEE conference on computer vision and pattern recognition (pp. 4651-4659)." (Year: 2016).*

"Wang et al., Tacotron: A fully end-to-end Text-to-Speech synthesis model, Mar. 2017, arXiv preprint arXiv:1703.10135, 164." (Year: 2017).*

(56) References Cited

OTHER PUBLICATIONS

"Barry et al., Sentiment Analysis of Online Review Using Bag-of-Words and LSTM Approaches, Dec. 7, 2017,In Proceedings of the IEEE conference on computer vision and pattern recognition (pp. 4651-4659)." (Year: 2017).*
Billy Peralta, "Embedded local Feature Selection within Mixture of Experts", 2013 (Year: 2013).*
Ruck et al., "The Multilayer Perception as an Approximation to a Bayes Optimal Discriminant Function," IEEE Transactions on Neural Networks, vol. 1, No. 4, Dec. 1990. pp. 1-3.
Schuster et al., "Bidirectional Recurrent Neural Networks," IEEE Transactions of Signal Processing, vol. 45, No. 11, Nov. 1997. pp. 1-9.
Sennrich et al., "Neural Machine Translation of Rare Words with Subword Units," Research Presented in this Publication was Conducted in Cooperation with Samsung Electronics Polska sp. zo.o.—Samsung R&D Institute, Poland. Jun. 10, 2016. pp. 1-11.
Shazeer et al., "Outrageously Large Neural Networks: The Sparsely-Gated Mixture-of-Experts Layer," https://arxiv.org/abs/1701.06538, Jan. 23, 2017. pp. 1-19.
Silver et al., "Mastering the Game of Go with Deep Neural Networks and Tree Search," Nature, 529(7587):484-487, doi: 10.1038/nature16961. Jan. 2016. pp. 1-37.
Socher, Recursive Deep Models for Semantic Compositionality Over a Sentiment Treebank, 2013 Conference on Empirical Methods in Natural Language Processing, pp. 1631-1642, Oct. 21, 2013 (Year: 2013).
Srivastava et al., "Dropout: A Simple Way to Prevent Neural Networks from Overfilling," Journal of Machine Learning Research. University of Toronto. Jun. 14, 2014. pp. 1-30.
Stalidis, Machine Learning Sentiment Prediction based on Hybrid Document Representation, arxiv.org, Nov. 29, 2015 (Year: 2015).
Stuner, Cascading BLSTM Networks For Handwritten Word Recognition, 2016 23rd International Conference on Pattern Recognition (ICPR), Dec. 8, 2016 (Year: 2016).
Tai, K.S. et al., "Improved Semantic Representations From Tree-Structured Long Short-Term Memory Networks", arXiv.org, v2, pp. 1-11, May 30, 2015.
Tang, D. et al., "Document Modeling with Gated Recurrent Neural Network for Sentiment Classification", Proceedings of the 2015 Conference on Empirical Methods in Natural Language Processing, pp. 1422-1432, Sep. 21, 2015.
Van Der Maaten et al., "Visualizing Data Using T-SNE," Journal of Machine Learning Research, (2579-2605). Nov. 9, 2008. pp. 1-27.
Wu et al., "Google's Neural Machine Translation System: Bridging the Gap Between Human and Machine ranslation," URL: http://arxiv.org/abs/1609.08144. eprint arXiv:1609.08144. Oct. 8, 2016. pp. 1-23.
Wu, Aspect-based Opinion Summarization with Convolutional Neural Networks, 2016 IEEE (Year: 2016).
Zoltan Tuske, Integrating Gaussian mixtures into deep neural networks: Softmax layer with hidden variables, 2015 IEEE International Conference on Acoustics, Speech and Signal Processing (ICASSP) (Year: 2015).
A. Almahairi et al: "Dynamic capacity networks", Proceedings of Machine Learning Research, vol. 48, Jun. 22, 2016 (Jun. 22, 2016), pp. 2549-2558, XP055479670.
Abdelazeem, A Greedy Approach for Building Classification Cascades, 2008 Seventh International Conference on Machine Learning and Applications (Year: 2008).
Amodel et al., "Deep Speech 2: End-to-End Speech Recognition in English and Mandarin," Published as a Conference Paper at the International Conference on Machine Learning. CoRR, abs/1512.02595. URL: http://arxiv.orgbs/1512.02595. Dec. 5, 2015. pp. 1-28.
Bradbury, Quasi-Recurrent Neural Networks, arxiv.org, Nov. 21, 2016 (Year: 2016).
Canadian Examiner's Report for App. No. 3,052,212 dated Nov. 9, 2020, 7 pages.
D. Krueger et al: "Zoneout: regularizing RNNs by randomly preserving hidden activations" , arXiv:1606.01305v2, Jun. 13, 2016 (Jun. 13, 2016), XP080705872.
Figurnov et al., "Spatially Adaptive Computation Time for Residual Networks," Conference on Computer Vision and Pattern Recognition (CVPR), 2017. CoRR, abs/1612.02297, 2016. URL: http://arxiv.org/abs/1612.02297. Jul. 2, 2017. pp. 1-13.
Gers et al., "Learning to Forget: Continual Prediction With LSTM," Neural Computation, 12(10):2451-2471. ISSN 0899-7667. Oct. 2000. pp. 1-19.
Graves et al., "Adaptive Computational Time for Recurrent Neural Networks," Corr, abs/1603.08983, 2016. URL: http:/arxiv.org/abs/1603.08983. Feb. 21, 2017. pp. 1-19.
Graves et al., "Supervised Sequence Labelling with Recurrent Neural Networks," Springer Berlin Heidelberger, 2012, pp. 1-137.
Hannun et al., "Deep Speeh: Scaling Up End to End Speech Recognition," CoRR, abs/1412.5567, 2014. URL: http:/arxiv.org/abs/1412.5567. Dec. 19, 2014. pp. 1-12.
He et al., "Deep Residual Learning for Image Recognition," CoRR, abs/1512.03385. URL: http://arxiv.org/abs/1512.03385. Dec. 10, 2015. pp. 1-12.
He et al., "Identity Mappings in Deep Residual Networks," ECCV: European Conference on Computer Vision, Jul. 25, 2016. pp. 1-15.
Hochreiter et al., "Long Short-Term Memory: Neural Computation," Neural Computation, vol. 9, Issue 8, Nov. 15, 1997, pp. 1-32.
International Preliminary Report on Patentability received for PCT Patent Application No. PCT/US18/22504, mailed on Jun. 28, 2019, 24 pages.
International Search Report and Written Opinion dated Aug. 10, 2018 issued in related PCT App. No. PCT/US2018/022504 (16 pages).
Jacobs et al., "Adaptive Mixtures of Local Experts," Neural Computation 3, 79-87, 1991. Massachusetts Institute of Technology, pp. 1-49.
Jordan et al., "Hierarchical Mixtures of Experts and the EM Algorithm," Proceedings of the 1993 International Joint Conference on Neural Networks. pp. 1-6.
Kingma et al., "ADAM: A Method for Stochastic Optimization," Published as a conference paper at International Conference on Learning Representations (ICLR). Jan. 30, 2017. arXiv:1412.6980. pp. 1-15.
L. Denoyer et al., "Deep sequential neural network," arXiv:1410.0510v1, Oct. 2, 2014, XP055469696, Retrieved from the Internet: URL:https://arxiv.org/abs/1410.0510v.1 [retrieved on Jun. 22, 2018], pp. 1-9 (9 pages).
L. Liu et al., "Dynamic deep neural networks: optimizing accuracy-efficiency trade-offs by selective execution," arXiv:1701.00299v1, Jan. 2, 2017, XP080739001, Retrieved from the internet: URL:https://arxiv.org/abs/1701.00299v1 [retrieved on Jun. 22, 2018] (12 pages).
Lee et al., "Fully Character-Level Neural Machine Translation Without Explicit Segmentation," Transactions of the Association for Computational Linguistics (TACL). arXiv:1610.03017v3. Jun. 13, 2017. pp. 1-13.
Merity et al., "Pointer Sentinel Mixture Models," Published as a Conference paper at the International Conference on Learning Representations (ICLR). Sep. 26, 2016. hllps://arxiv.org/abs/1609.07843v1. pp. 1-13.
Mikolov et al., "Efficient Estimation of Word Representations in Vector Space," International Conference on Learning Representation, 2013 (ICLR). Cornell University Library. Jan. 16, 2013. arXiv:1301.3781. pp. 1-12.
N. Shazeer et al: "Outrageously large neural networks: the sparsely-gated mixture-of-experts layer" , arXiv:1701.06538vl, Jan. 23, 2017 (Jan. 23, 2017), XP080750950.
Pennington et al., "GloVe: Global Vectors for Word Representation", Proceedings of the 2014 Conference on Empirical Methods in Natural Language Processing (EMNLP), Doha, Qatar. Oct. 25-29, 2014. https://nlp.stanford.edu/pubs/glove.pdf. pp. 1532-1543, pp. 1-12.

* cited by examiner

DEEP NEURAL NETWORK-BASED DECISION NETWORK

CROSS REFERENCE TO OTHER APPLICATIONS

This application is a continuation of and claims priority to U.S. Nonprovisional patent application Ser. No. 15/853,530 entitled "PROBABILITY-BASED GUIDER", filed on Dec. 22, 2017, which in turn claims the benefit of U.S. Provisional Patent Application No. 62/471,934, entitled "LEARNING WHEN TO SKIM AND WHEN TO READ," filed on Mar. 15, 2017. The aforementioned applications are hereby incorporated by reference for all purposes.

This application incorporates by reference US Nonprovisional Patent Application entitled "PROBABILITY-BASED GUIDER", U.S. patent application Ser. No. 15/853,530, filed Dec. 22, 2017.

FIELD OF THE TECHNOLOGY DISCLOSED

The technology disclosed relates to artificial intelligence type computers and digital data processing systems and corresponding data processing methods and products for emulation of intelligence (i.e., knowledge based systems, reasoning systems, and knowledge acquisition systems); and including systems for reasoning with uncertainty (e.g., fuzzy logic systems), adaptive systems, machine learning systems, and artificial neural networks. The technology disclosed uses deep neural networks like long short-term memory (LSTM) networks for natural language processing tasks.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Recent deep learning advances in natural language processing (NLP) have been focused on one goal—state-of-the-art performance no matter the computational cost, We propose a deep learning-based solution that reduces computational cost while retaining high accuracy provided by deep neural networks. By letting a fast baseline model decide which sentence is easy or difficult, we show that an inexpensive classifier, such as the bag of words, learns how to separate easy from difficult sentences. Our results find that thresholding probability (produced as a byproduct during classification) outperforms not having a guided strategy on accuracy versus time saved metric.

Deep learning models are getting bigger, better, and more expensive in the all-or-nothing hunt for reaching superhuman performance. In natural language processing (NLP), often new additions base their novel state-of-the-art design on a relatively narrow extension that solves a complex linguistic task really well. This includes incorporating semantic knowledge, reducing dictionary size, or even increasing dictionary size. Intuitively, it would make sense that such additions would only exert the new system to those data points having the specific challenges that the addition conquered. That is, however, often not the case as deep learning algorithms are mostly benchmarked with an invariant of being oblivious to the given data point and the difficulty hereof. Further, with the increased understanding that deeper means better, current state-of-the-art systems can be excessive and waste computation to secure a narrow accuracy improvement in a linguistic area that may not be relevant in most scenarios. For example, FIG. 3 illustrates how a cheap model clusters sentences when it is trained for sentiment analysis (e.g., using backpropagation). In FIG. 3, some clusters are marked to show that some data points are easier than others and that supervised learning can reveal clustering of certain linguistic properties.

The technology disclosed proposes two different methods for understanding when a sentence is easy to classify and when it is difficult. The technology disclosed applies either a cheap bag of words (skimming) or an expensive LSTM (reading) to classify a sentence based on the decision of the methods. The first method uses the probability output of the bag of words system as a confidence measure. The second method builds a decision neural network to learn the relationship between when the bag of words might be correct and when the LSTM might be correct.

Both our methods outperform not having a guided baseline strategy, and can save significant computation resources for engineering teams.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DETAILED DESCRIPTION

Figure 1:
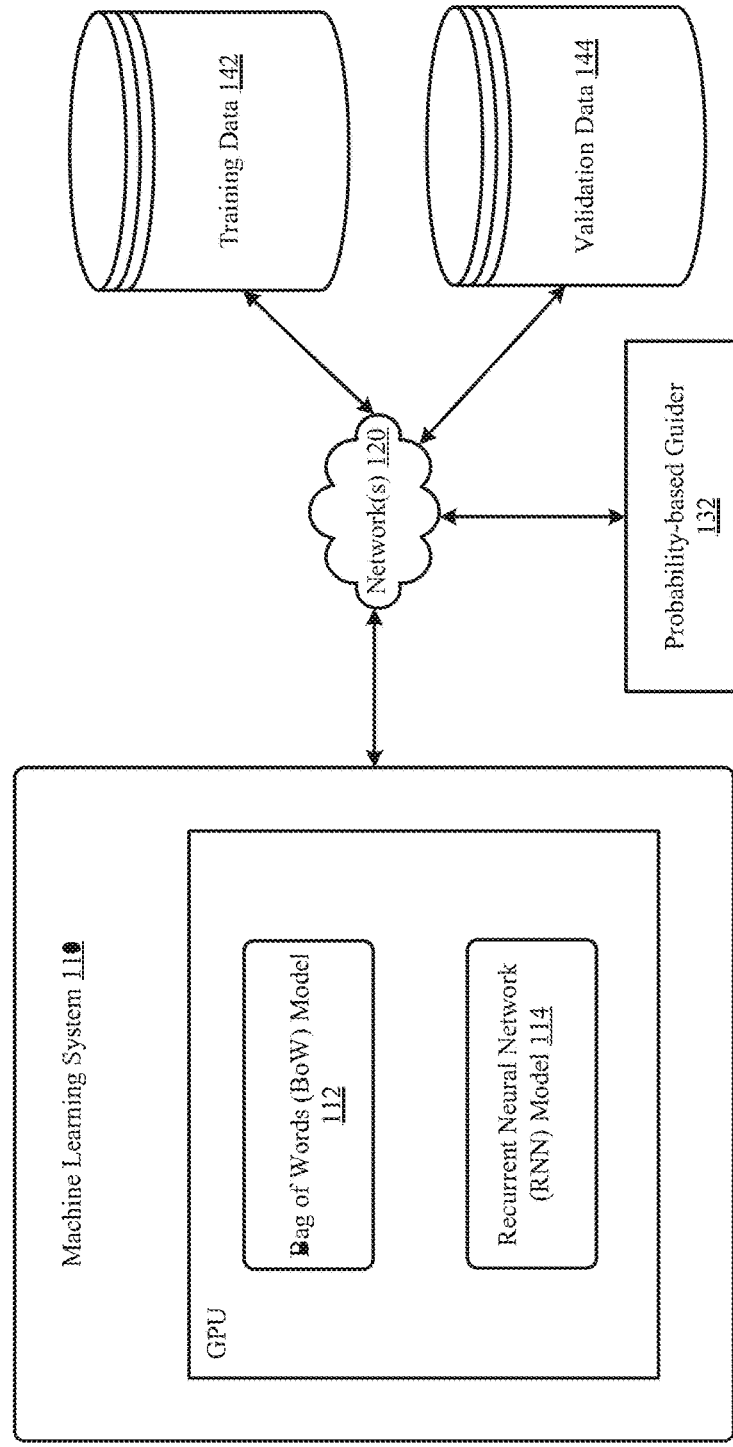
FIG. 1 illustrates an architectural level schematic of a system in which a probability-based guider automates selection of a machine learning model for performing a machine classification task. In one implementation, the machine classification task can be sentiment classification of a sentence. The sentiment classification task can comprise classifying a sentence as having a positive or negative sentiment. In other implementations, the sentiment classification task can comprise classifying the sentence as having a very positive, somewhat positive, neutral, very negative, or somewhat negative sentiment. In yet other implementations, additional, fewer, or different class labels can be used. In further implementations, other machine classification tasks can be performed such as speech recognition, machine translation, text summarization, question answering, image captioning, and text-to-speech (TTS) synthesis.

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

Introduction

The technical problem that the technology disclosed sets out to solve is how to introduce computation efficiency in deep neural networks-based natural language processing tasks, while maintaining the accuracy provided by modern deep neural networks.

To this end, the technology disclosed proposes using a combination of computationally cheap, less-accurate bag of words (BoW) model and computationally expensive, more-accurate long short-term memory (LSTM) model to perform natural processing tasks such as sentiment analysis. The use of cheap, less-accurate BoW model is referred to herein as "skimming". The use of expensive, more-accurate LSTM model is referred to herein as "reading".

The technology disclosed presents a probability-based guider (PBG). PBG combines the use of BoW model and the LSTM model. PBG uses a probability thresholding strategy to determine, based on the results of the BoW model, whether to invoke the LSTM model for reliably classifying a sentence as positive or negative. PBG uses the probability output of the BoW model as a confidence measure and subsequently invokes the LSTM model only when the probability output of the BoW model is below a set threshold.

The technology disclosed also presents a deep neural network-based decision network (DDN) that is trained to learn the relationship between the BoW model and the LSTM model (e.g., using backpropagation) and to invoke only one of the two models. In other words, for a particular input, the DDN selects the correct model from an ensemble of pre-trained models, with the selection conditioned on minimizing the computational cost and maximizing and/or preserving the classification accuracy. In one implementation, DDN includes a two-layer multilayer perceptron (MLP) stacked on top of a BoW model, with recurring dropout layers, ReLU nonlinearities, and fully-connected layers.

Unlike PBG, DDN is a neural network-based model that can be trained (e.g., using backpropagation). The PBG always has to use the BoW model and often uses both the BoW and the LSTM models. In contrast, the DDN may decide to skip the BoW model and only use the LSTM model or just stop at the BoW model because it knows that the LSTM model is unlikely to produce better results.

Any neural network-based model is only as good as the data available to train it. Having a large training set prevents overfitting of the model. To this end, the technology disclosed uses the BoW and the LSTM models to automatically generate labeled training examples, with the labels assigned based on a confusion matrix. The DDN is then trained on a secondary supervised classification task of choosing the correct model for classifying a given sentence. The confusion matrix identifies how often the two models correctly and incorrectly classify a sentence as positive or negative. The DDN is then trained on the automatically labeled sentences.

The technology disclosed then creates a new held-out split from the original full training set. The full training set comprises a model training set (e.g., 80% of training data) and a decision training set (remaining 20% of training data). First, the BoW and the LSTM models are trained on the model training set to generate labels for the DDN (e.g., using backpropagation). The DDN is then trained on the decision training set (e.g., using backpropagation). Lastly, the BoW and the LSTM models are fine-tuned on the full training set while holding the DDN fixed. This helps DDN generalize to models that are fine-tuned on the full training set.

System Overview—Probability-Based Guider

We describe a system for sentiment classification of input sentences. The system and processes are described with reference to FIG. 1 showing an architectural level schematic of a system in accordance with an implementation. Because FIG. 1 is an architectural diagram, certain details are intentionally omitted to improve the clarity of the description.

The discussion of FIG. 1 is organized as follows. First, the elements of the figure are described, followed by their interconnections. Then, the use of the elements in the system is described in greater detail.

FIG. 1 includes the system 100. The system 100 includes a machine learning system 110, a network(s) 120, a training database 142, a validation database 144, and a probability-based guider 132. In other implementations, the system 100 also includes a testing database with testing data that is used to test the machine learning system 110 during inference (production or testing).

The machine learning system 110 includes a bag of words (abbreviated BoW) model 112 and a recurrent neural network (abbreviated RNN) model 114. The training database 142 and the validation database 144 contain sentiment analysis data such as natural language sentences with positive and negative sentiment labels for each sentence. In one implementation, the training database 142 and the validation database 144 contain English language sentences and a positive or a negative sentiment label for each sentence. The BoW 112 and the RNN 114 separately perform the sentiment classification task on one sentence from the training database 142 or the validation database 144 at a time. Both the BoW 112 and the RNN 114 can run a variety of hardware processors such as graphic processor unit (GPUs). Neural network-based models involve computationally intensive methods. GPUs are well suited for these types of computations. Recently, specialized hardware is being developed to efficiently train neural network models.

A recurrent neural network (RNN), such as RNN 114, processes variable-length sequence input. It uses a recurrent hidden state whose activation is dependent on that of the one immediate before. More formally, given an input sequence $x=(x_1, x_2, \ldots, x_T)$, a RNN updates the hidden vector sequence $h=(h_1, h_2, \ldots, h_T)$ and output vector sequence $y=(y_1, y_2, \ldots, y_T)$ from t=1 to T as follows:

$$h_t = H(W_{xh}x_t + W_{hh}h_{t-1} + b_h)$$

$$y_t = W_{hy}h_t + b_y$$

In the mathematical formulation above, W denotes weight matrices, b denotes bias vectors, and H is the recurrent hidden layer function.

Long short-term memory (LSTM), such as LSTM model 244, is a powerful variant on the RNN 114. A LSTM is a cell in a neural network that is repeatedly exercised in timesteps to produce sequential outputs from sequential inputs. The output is often referred to as a hidden state, which should not be confused with the cell's memory. Inputs are a hidden state and memory from a prior timestep and a current input. The cell has an input activation function, memory, and gates. The input activation function maps the input into a range, such as −1 to 1 for a tan h activation function. The gates determine weights applied to updating the memory and generating a hidden state output result from the memory. The gates are a forget gate, an input gate, and an output gate. The forget gate attenuates the memory. The input gate mixes activated inputs with the attenuated memory. The output gate controls hidden state output from the memory. The hidden state output can directly label an input or it can be processed by another component to emit a word or other label or generate a probability distribution over labels.

The input gate controls how much of the current input $x_t$ and the previous hidden state $h_{t-1}$ enters the current memory cell state $m_t$ and is represented as:

$$i_t = \sigma(W_{xi}x_t + W_{hi}h_{t-1} + b_i) = \sigma(linear_{xi}(x_t) + linear_{hi}(h_{t-1}))$$

The forget gate operates on the current memory cell state $m_t$ and the previous memory cell state $m_{t-1}$ and decides whether to erase (set to zero) or keep individual components of the memory cell and is represented as:

$$f_t = \sigma(W_{xf}x_t + W_{hf}h_{t-1} + b_f)$$

The output gate scales the output from the memory cell and is represented as:

$$o_t = \sigma(W_{xo}x_t + W_{ho}h_{t-1} + b_o)$$

The LSTM can also include a current hidden state producer that outputs the current hidden state $h_t$ scaled by a tan h (squashed) transformation of the current memory cell state $m_t$ and is represented as:

$$h_t = o_t \square \tanh(m_t)$$

In the above equation, □ represents element-wise product.

A bag of words (BoW) model, such as BoW 112, determines a mean of the input words of a sentence across each feature dimension. In one implementation, the BoW model determines average or mean of word embeddings (e.g., GloVe or word2vec). Taking a mean can be a cheap operation and can reduce the dimensionality of the sentence to a fixed sized vector. Some examples of the BoW model or variants thereof include a continuous bag of words (CBoW) model and a skip-gram model proposed by Tomas Mikolov, Kai Chen, Greg Corrado, and Jeffrey Dean. 2013a. *Efficient Estimation of Word Representations in Vector Space.* In ICLR Workshop Papers; Tomas Mikolov, Ilya Sutskever, Kai Chen, Greg Corrado, and Jeffrey Dean. 2013b. *Distributed representations of words and phrases and their compositionality.* In NIPS, pages 3111-3119; and Tomas Mikolov, Wen tau Yih, and Geoffrey Zweig. 2013c. *Linguistic regularities in continuous space word representations.* In HLTNAACL, which are incorporated by reference for all purposes as if fully set forth herein. A CBoW model predicts a word from the sentence context. A skip-gram model predicts the sentence context from the word.

During training of the BoW 112 and the RNN 114, the networks receive input sentences from the training database 142 and process it to perform the sentiment classification task. During validation, the BoW 112 and the RNN 114 receive input sentences from the validation database 144 and process it to perform the sentiment classification task. The machine learning system 110, the training database 142, the validation database 144, and the probability-based guider 132 are in communication with each other via the network(s) 120.

In other implementations, probability-based guider 132 can be used with other machine classification tasks such as speech recognition, machine translation, text summarization, question answering, image captioning, and text-to-speech (TTS) synthesis.

Having presented a high level description of the system 100, the discussion now turns to detailed description of various components of the system 100.

Process Flow

Figure 2A:
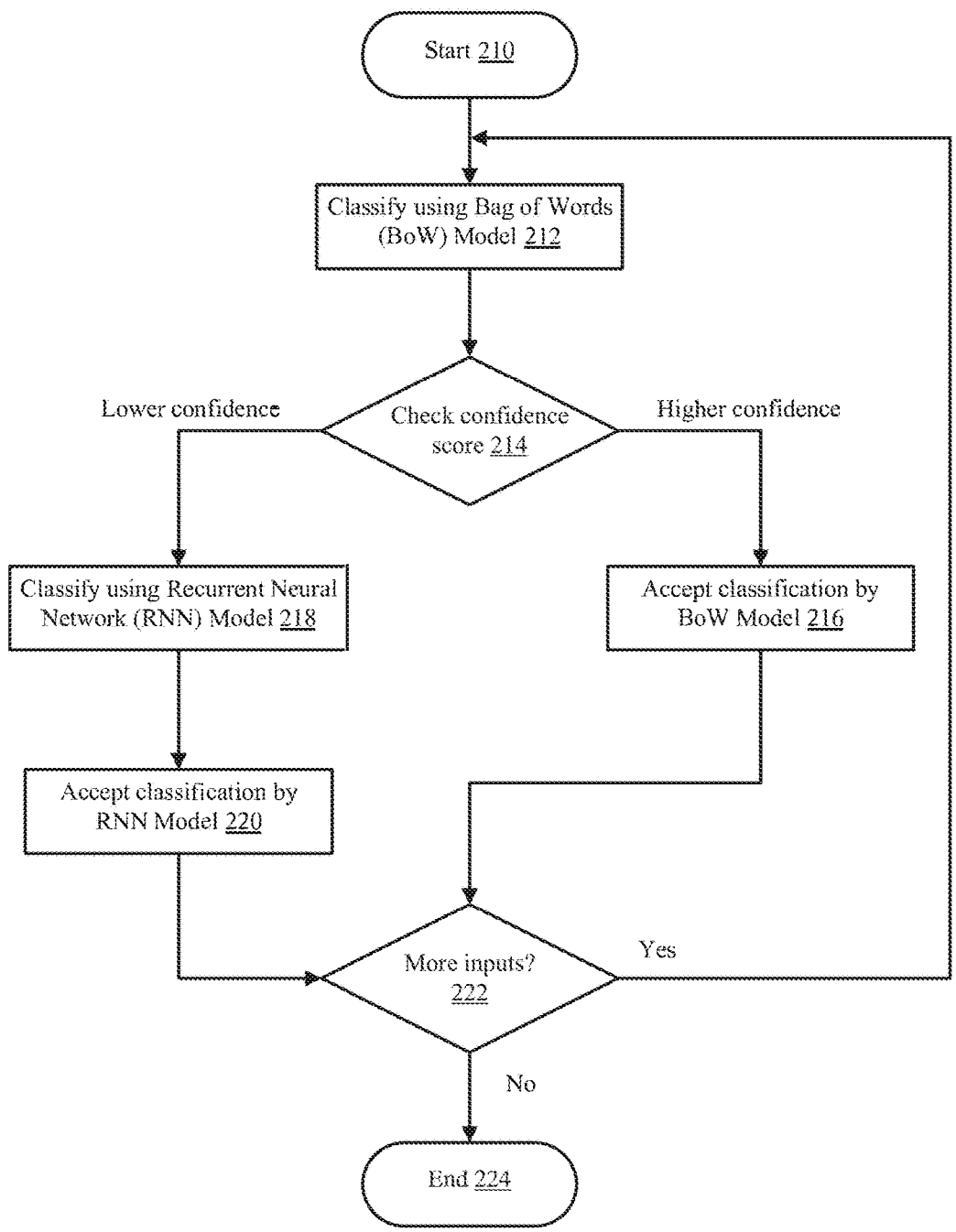
FIG. 2A is a flowchart illustrating process steps for classification of input sentences using the probability-based guider of FIG. 1.

FIG. 2A is a flowchart 200A illustrating the processing of input sentences for sentiment classification task. The process starts at step 210 when a sentence is given as input to the BoW model 112. At step 212, the BoW model 112 evaluates the input sentence and produces a confidence score which specifies a likelihood of the sentence's sentiment being positive or negative. In one implementation, the value of the confidence score is a real value between zero and one and can be preset (e.g., 0.5). In this implementation, a confidence score value of less than 0.5 means that the input sentence belongs to a first sentiment class and a confidence score of greater that 0.5 means that the sentence belongs to a second sentiment class. A confidence score value closer to the 0.5, i.e., 0.49 or 0.51 means that the BoW model 112 is not very confident about the sentiment of the input sentence as being positive or negative. Confidence score values that are farther away from 0.5, i.e., 1 or 0.9 indicate that BoW model is very confident about sentiment of the sentence as being positive or negative.

At step 214, the value of the confidence score generated by the BoW model 112 is checked by the probability-based guider 132 against a set threshold (e.g., 0.5). In one implementation, the threshold is a single value. For example, for confidence score values between zero and one (as illustrated above), a threshold may be set at 0.4 for the first sentiment class and 0.6 for the second sentiment class. In such an implementation, if the confidence score generated by the BoW model 112 is below 0.4, the probability-based guider considers this as a confident classification of the sentence in the first sentiment class. Likewise, a confidence score above 0.6 shows that the BoW model 112 is confident in classifying the input sentence in the second sentiment class. It is understood that different values of the threshold can be selected based on user-preferences and requirements.

The probability-based guider compares the confidence score produced by the BoW model 112 against the set threshold. If the confidence score is higher than the threshold based on comparison, then sentiment classification of the sentence by the BoW mode is accepted at step 216. Otherwise, if the confidence score is lower than the threshold based on comparison, then the sentence is given as input to the RNN model 114 at step 218. The RNN model 114 then classifies the sentence's sentiment as positive or negative. The sentiment classification produced by the RNN model 114 is accepted at step 220. At step 222, the system checks if there are more input sentences for sentiment classification. If this is true, then the next sentence is given as input to the BoW mode at 212 and the process is repeated. The process ends at step 224 when there are no further input sentences for sentiment classification.

Figure 2B:
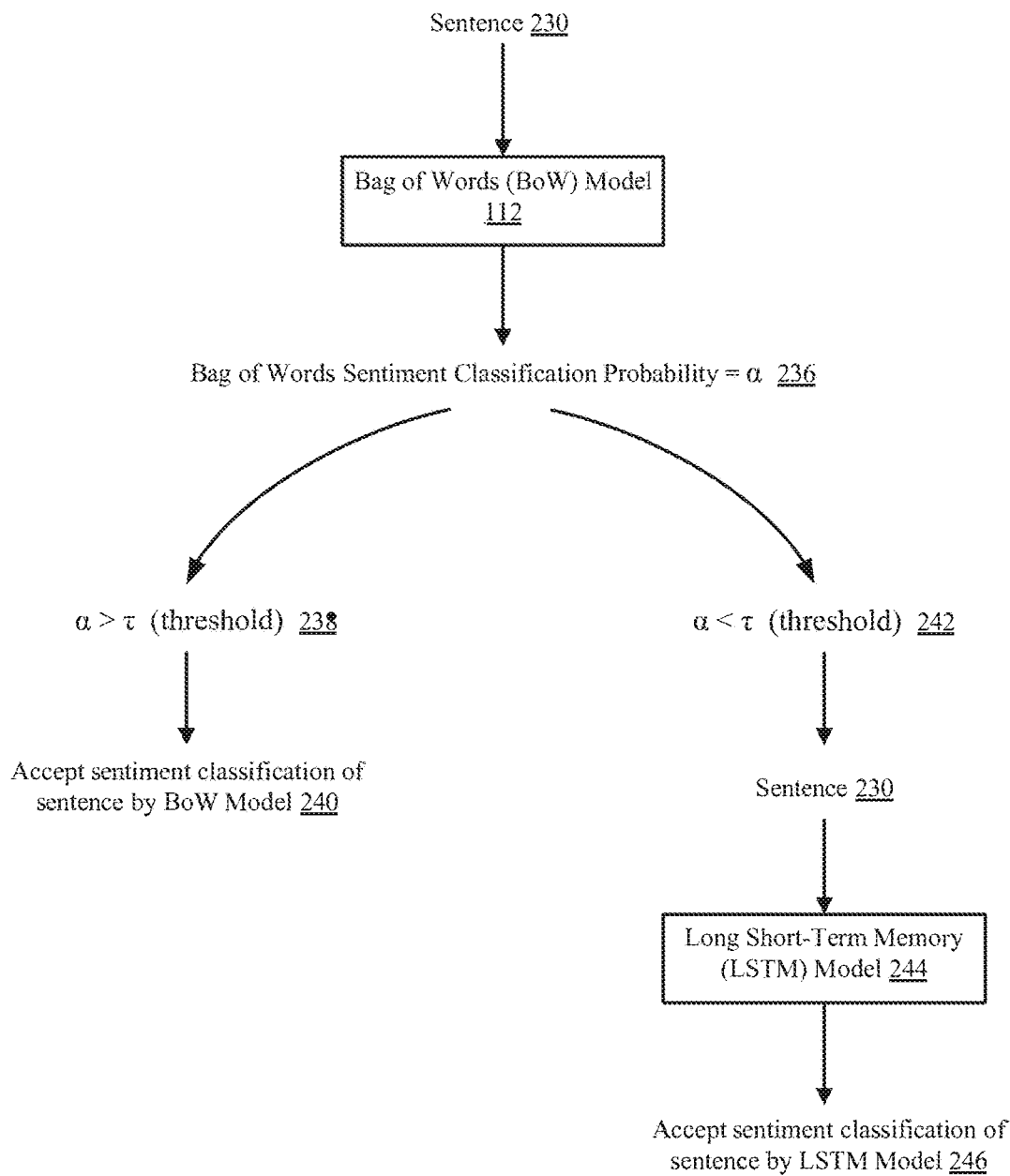
FIG. 2B is a flowchart illustrating process steps for sentiment classification task.

FIG. 2B is a process flow 200B illustrating a sentence sentiment classification task. The sentiment classification task can comprise classifying a sentence as having a positive or negative sentiment. In other implementations, the sentiment classification task can comprise classifying the sentence as having a very positive, somewhat positive, neutral, very negative, or somewhat negative sentiment.

A sentence 230 is given as input to a neural network-based first natural language processing (NLP) model such as the BoW model 112. The BoW model 112 generates a bag of word sentiment classification probability "α" (read as alpha) at step 236. The probability-based guider 132 compares the value of "α" with the set threshold value "τ" (read as tau) to determine whether the input sentence requires supplemental evaluation by a neural network-based second NLP model such as LSTM 244, which is more accurate and computationally more expensive than the first NLP model. If the value of "α" is greater than the value of the threshold "τ" (step 238), sentiment classification of the input sentence 230 by BoW model 112 is accepted (step 240).

If the value of the classification probability "α" is less than the value of the threshold "τ" (step 242), the input sentence 230 is sent to the long short-term memory (LSTM) model 244 for sentiment classification task. The LSTM 244 then generates a sentiment classification of the sentence which is accepted at step 246.

Figure 3:
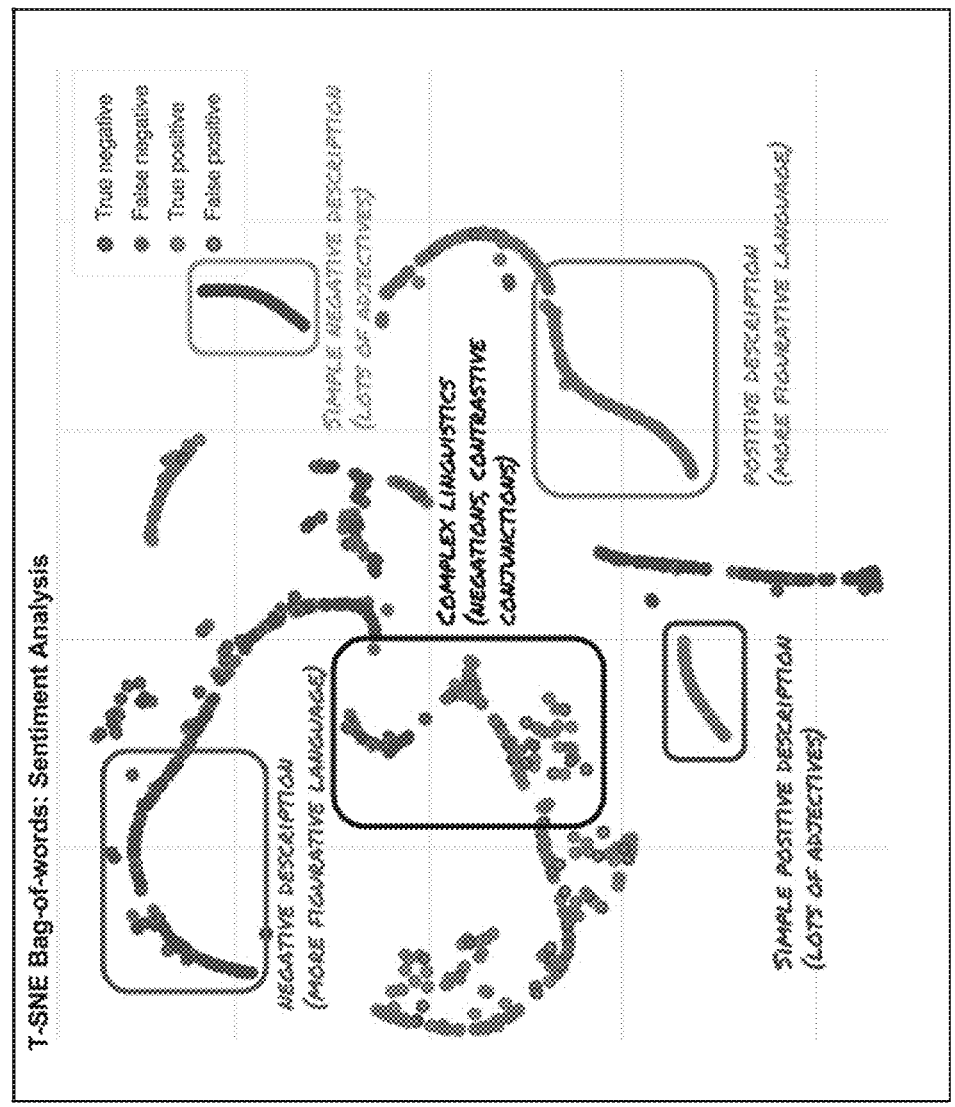
FIG. 3 is a graphical illustration of sentiment classification results using bag of words (abbreviated BoW) model on input sentences from an example database.

FIG. 3 illustrates innards 300 of the BoW model, classifying sentences as positive or negative. One way of exploring deep learning models is by plotting how each sentence is represented in the hidden layers. However, as the hidden layers are often high dimensional, algorithms such as t-distributed stochastic neighbor embedding (T-SNE) are used to reduce dimensionality to two-dimensions (2D) to allow human inspections. T-SNE is a machine learning algorithm for dimensionality reduction and allows visualizations of high dimensional data into a two or three dimensional space.

FIG. 3 is a visualization of the last hidden layer from a two-layered multi-layered perceptron (MLP) on top of a BoW model 112. The boundary boxes in FIG. 3 offer some important insights. Real world data comes in different levels of difficulties; some sentences are easily classified while others contain complex semantic structures. Linguistically complex sentences have co-occurrences of negative and positive constituents. Additionally, linguistically complex sentences can have multiple instances of negative words and contrastive conjunctions. A computationally less expensive model such the BoW model 112 can confidently classify linguistically simple sentences. However, a less expensive model produces less confident classification score on linguistically complex sentences. On the contrary, for linguistically simple sentences a computationally less expensive model such as the BoW model 112 can generate confident classification scores, and therefore a computationally expensive model such as the LSTM 244 is not required.

Model Architecture

Figure 4:
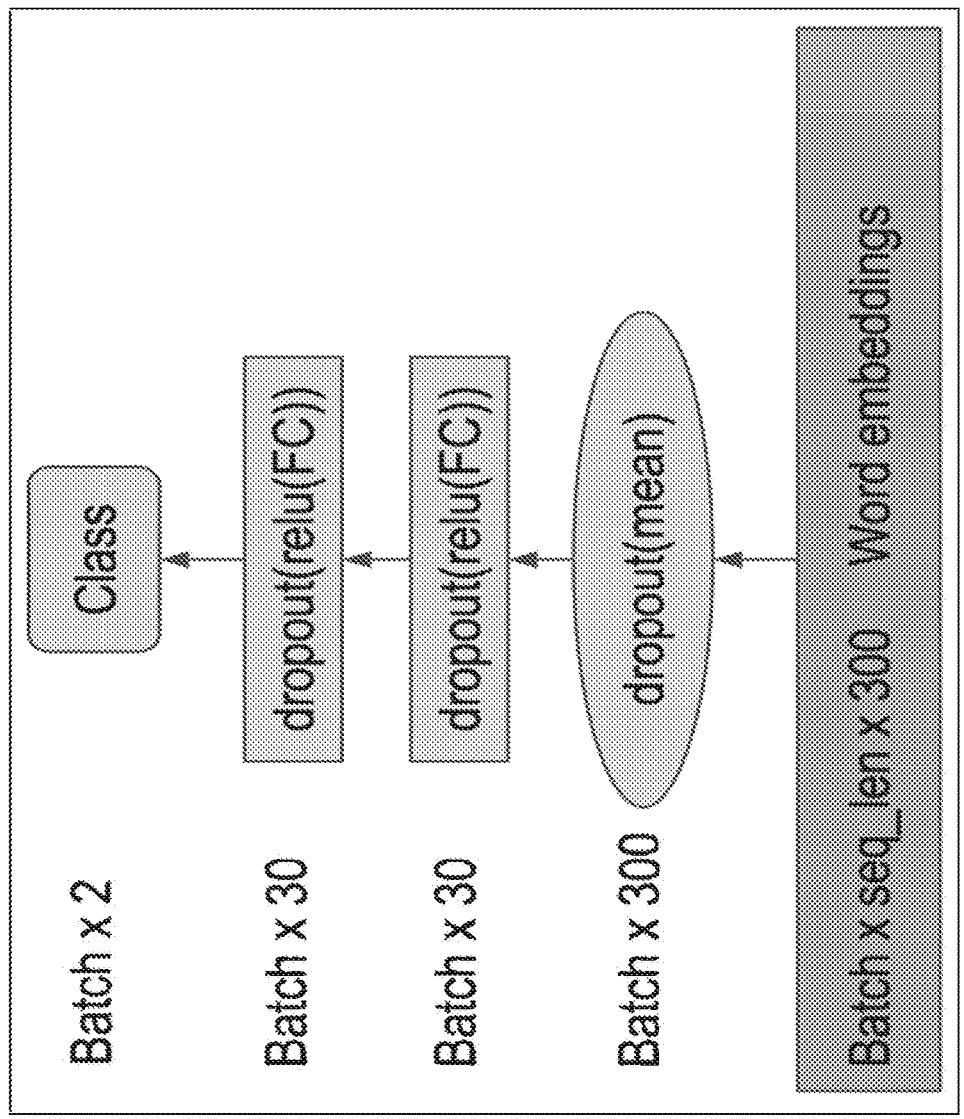
FIG. 4 is an example architecture of the BoW model.

FIG. 4 is an architecture 400 of the BoW model 112. The word embeddings in the bottom box are initialized with GloVe (Global Vectors for Word Representations). Other word embedding models such as Word2Vec can also be used to generate word embeddings. This is followed by calculation of the mean of the words (bag of words) and two layer MLP with dropout. The output layer at the top is a classifier, generating a positive or a negative sentiment classification for the input sentence. This is only one implementation of the architecture 400. In other implementations, any other conventional or future-developed BoW architectures can be used herein. Such implementations will be readily apparent to those skilled in the art without departing from the spirit and scope of the technology disclosed.

Figure 5:
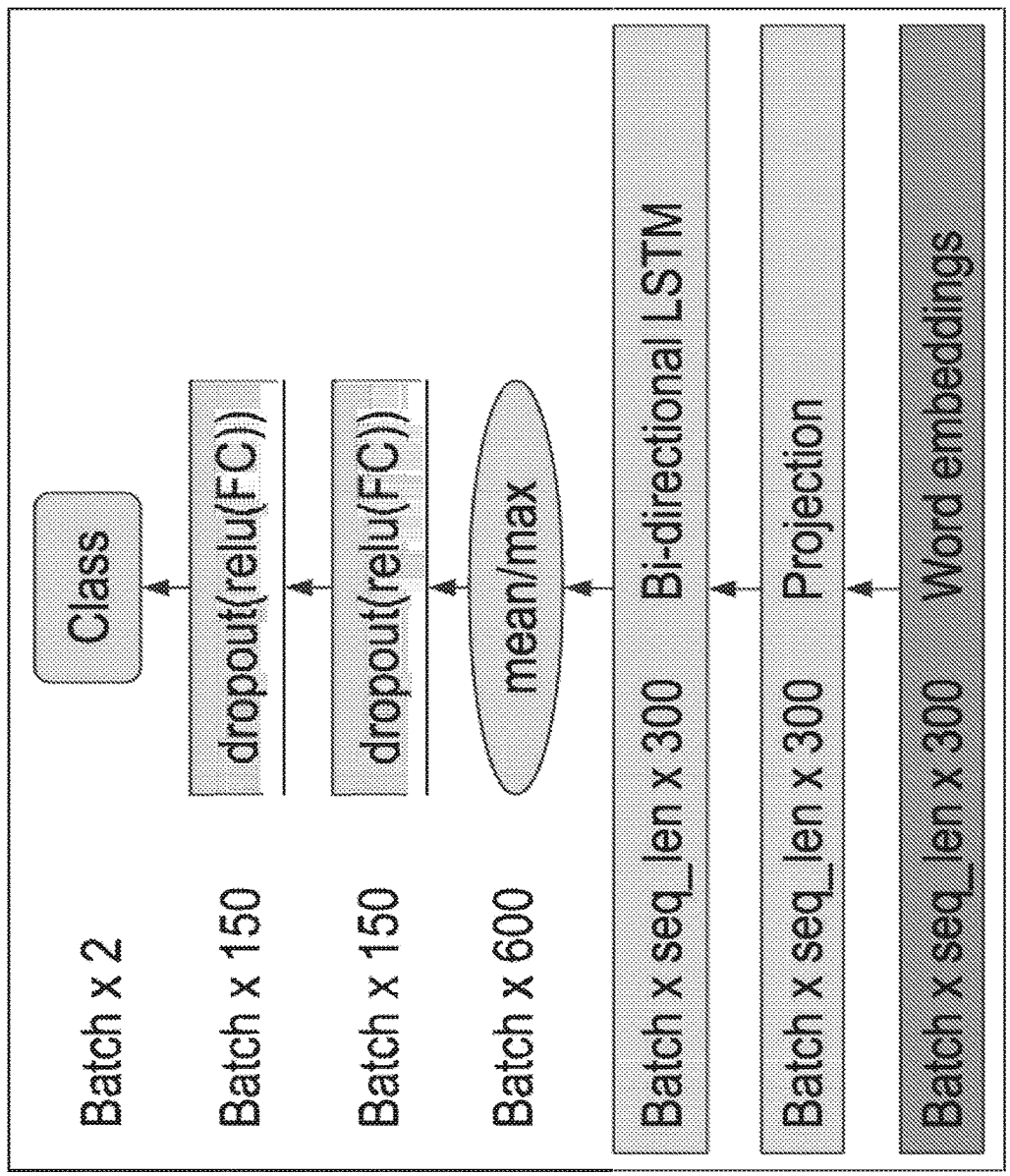
FIG. 5 is an example architecture of long short-term memory (abbreviated LSTM) model.

FIG. 5 is an architecture 500 of the LSTM model 244. The word embeddings in the bottom box are initialized with GloVe as above. Gradients are not tracked through the word embeddings. A bidirectional RNN is used with LSTM cells, in similar manner to the BoW model. Hidden states of RNN are used to extract mean and max values. This is followed by a two layer MLP with dropout. Finally, the output layer classifies the sentiment of the input sentence as positive or negative. This is only one implementation of the architecture 500. In other implementations, any other conventional or future-developed RNN or LSTM architectures can be used herein. Such implementations will be readily apparent to those skilled in the art without departing from the spirit and scope of the technology disclosed.

Validation Results

The following figures illustrate the performance of the BoW model 112 and the RNN model 114 on the validation database 144.

Figure 6A:
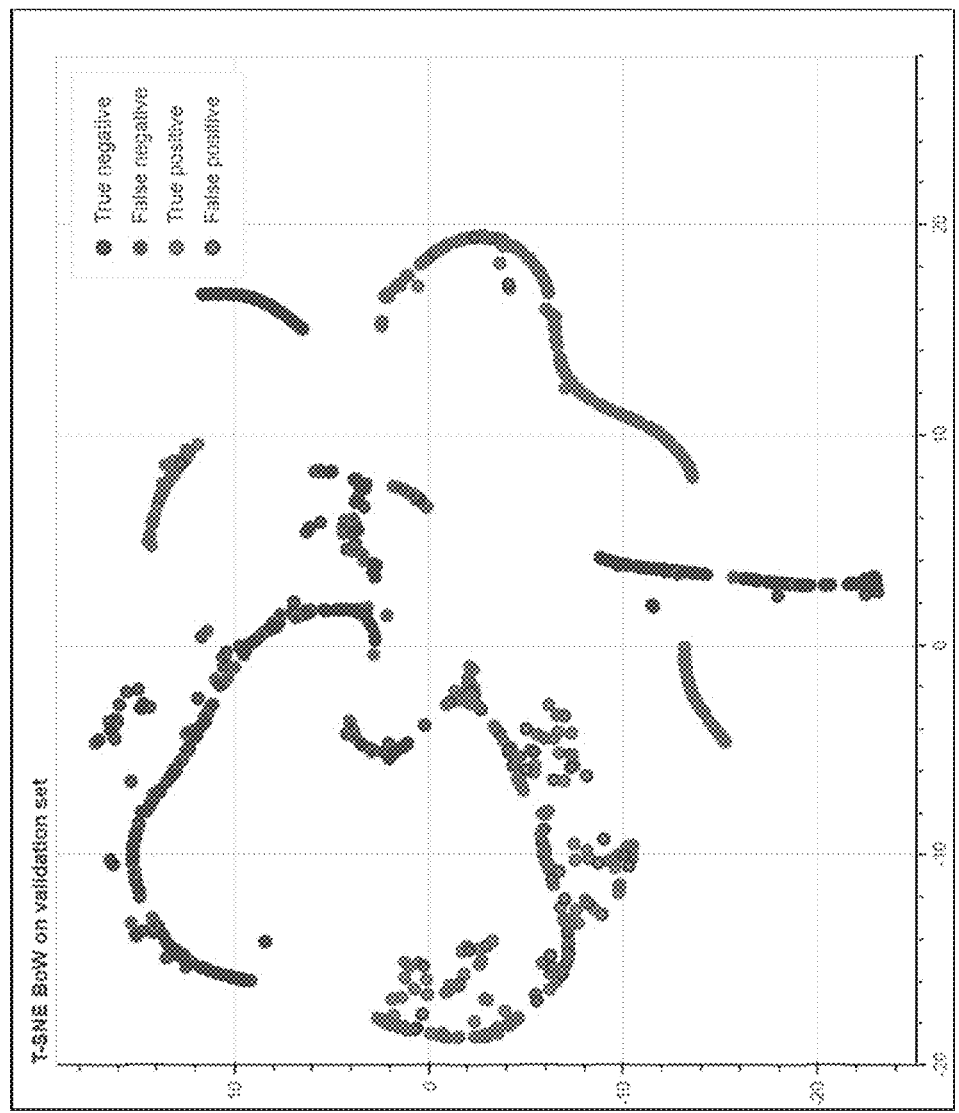
FIG. 6A is a graphical illustration of sentiment prediction results on input sentences from an example database using the BoW model.

FIG. 6A is a T-SNE plot 600A of the last hidden layer in the BoW model 112. Each data point in the plot 600A is a sentence. The data points are colored. The center of a data point represents its prediction by the BoW model 112. Blue color means a sentence represents a positive sentiment and a red color indicates a sentence representing a negative sentiment. The color of the line around the center indicates the actual sentiment label of the sentence. This allows for inspection of when the BoW model 112 has correctly predicted the sentiment of the sentence and when it is wrong.

A data point with a red colored center and a red colored border indicates a true negative meaning the model correctly predicted a negative sentiment sentence. A data point with a red colored center and blue colored border is a false negative meaning the model incorrectly predicted a positive sentiment sentence as a negative sentiment sentence. A data point with a blue colored center and a blue colored border indicates a true positive meaning the model correctly predicted a positive sentence. A data point with a blue colored center and a red colored border indicates false positive meaning the model incorrectly predicted a negative sentiment sentence as a positive sentiment sentence.

Analysis of the plot 600A shows that sentences fall into clusters according to their linguistic complexity. Some clusters lie along a simple manifold which are predicted with high confidence score by the BoW model 112. Other clustered are more scattered and are assigned low confidence scores by the BoW model 112. Further analysis of the sentence structure indicated that sentences with both positive and negative constituent are difficult to predict accurately by the BoW model 112.

Figure 6B:
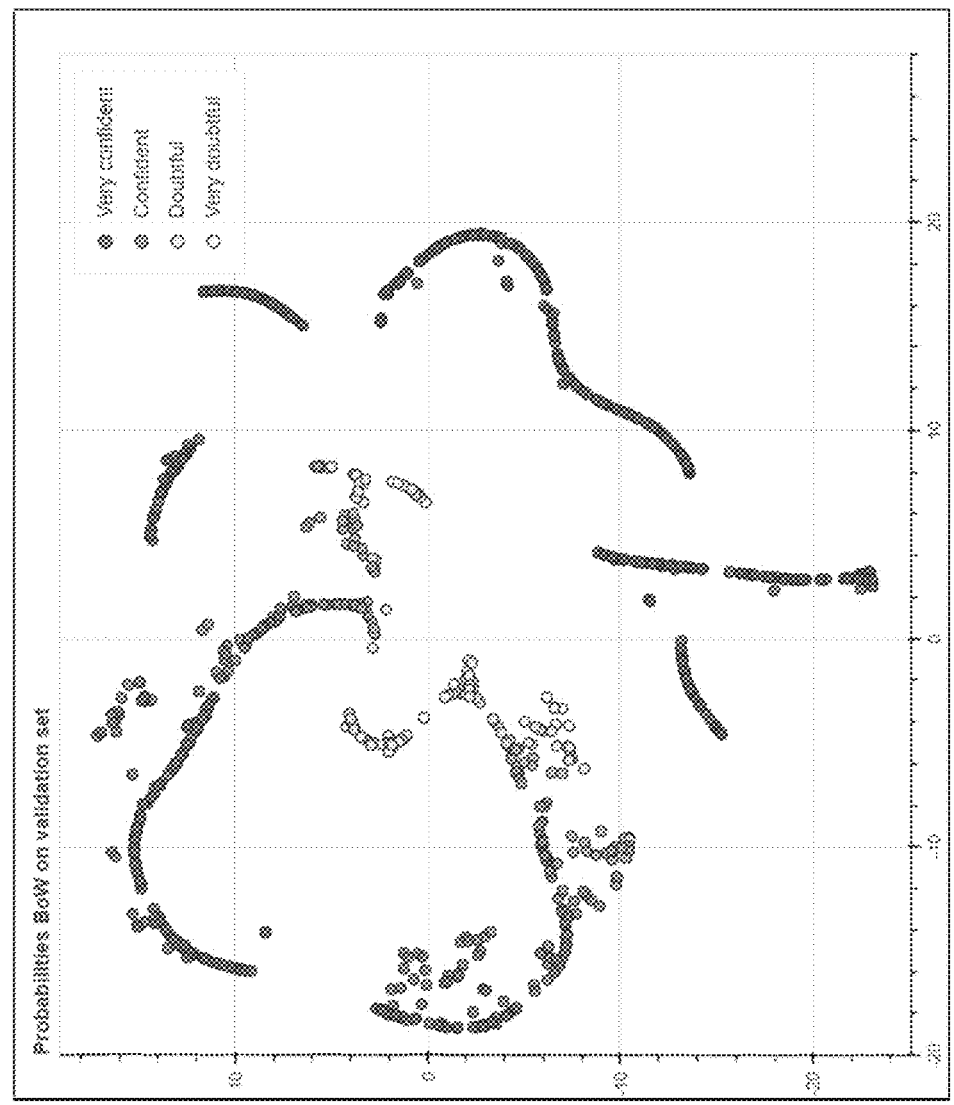
FIG. 6B illustrates probabilities assigned to predicted sentiment classes in the output layer of the BoW model of FIG. 6A.

FIG. 6B shows a plot 600B of probability assigned to the predicted class in the output layer of the BoW model 112. The dark blue colored data points indicate high confidence of the model in sentence sentiment prediction while light colored data points indicate lower confidence of the model in sentence sentiment prediction.

Figure 7A:
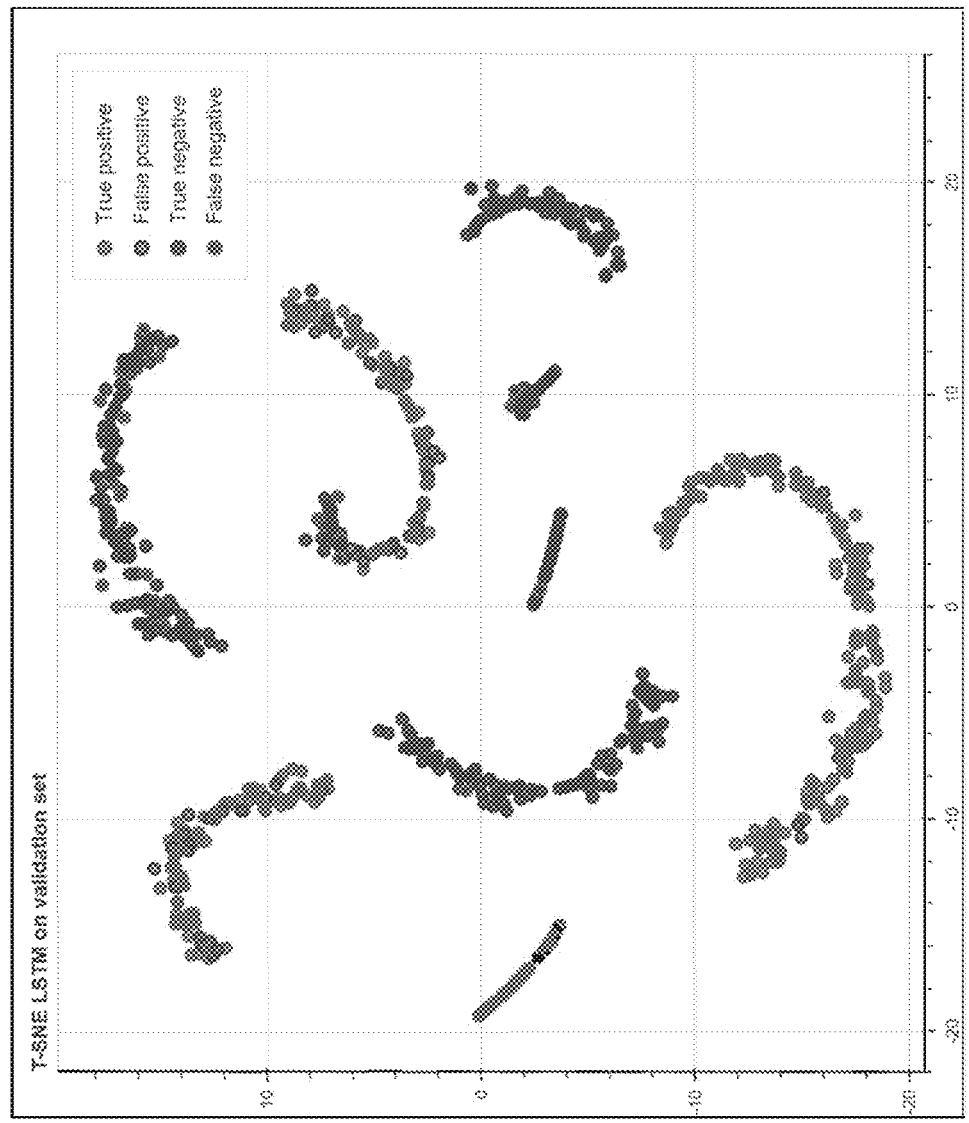
FIG. 7A is a graphical illustration of sentiment prediction results on input sentences from an example database using the LSTM model.
Figure 7B:
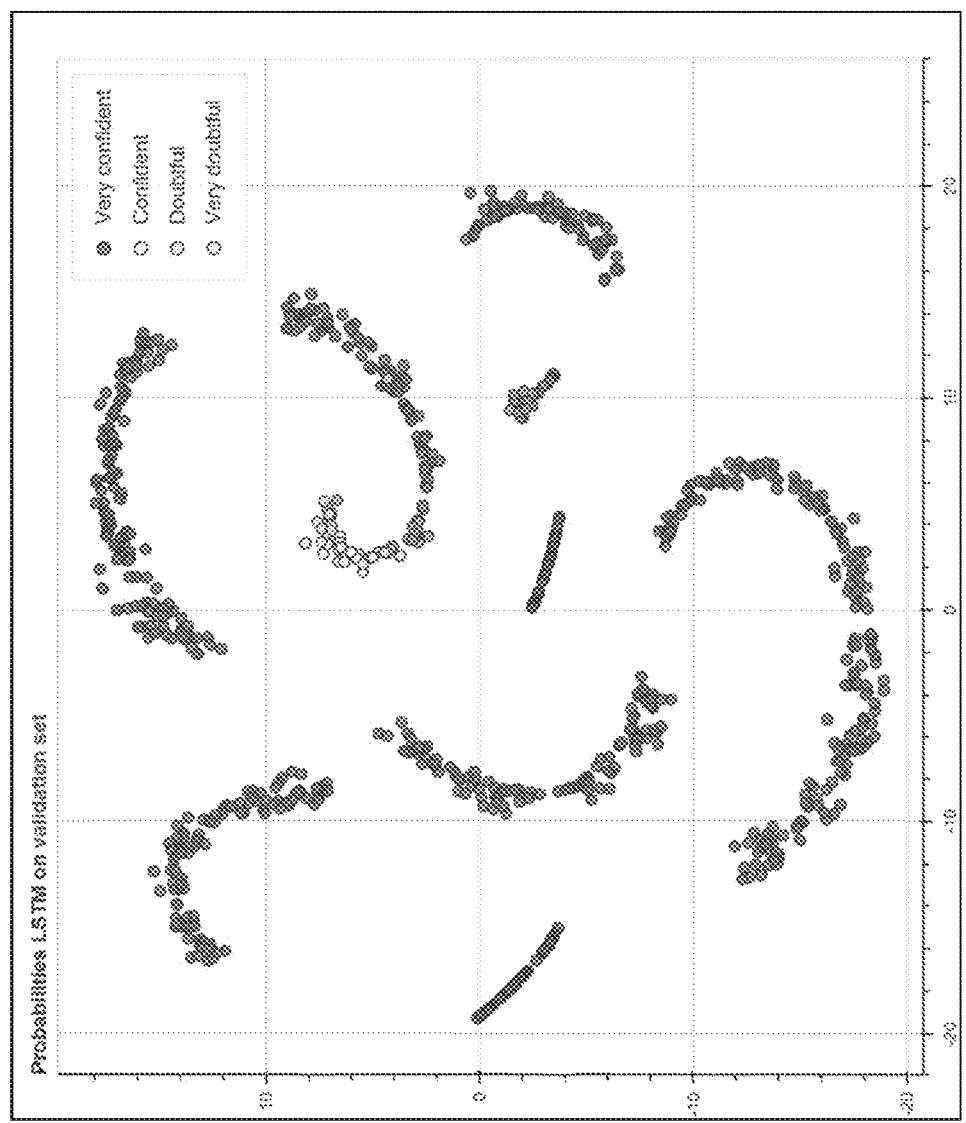
FIG. 7B illustrates probabilities assigned to predicted sentiment classes in the output layer of the LSTM model of FIG. 7A.

FIG. 7A and FIG. 7B are validation results for LSTM model 244. FIG. 7A is a plot 700A and is similar to plot 600A. We observe that plot 700A for LSTM model 244 has relatively few data points with low confidence. The LSTM model 244 classifies the sentences containing positive and negative sentiments with higher confidence. Plot 700B in FIG. 7B illustrates that LSTM model 244 correctly classifies most of the sentences (represented as data points). Dark blue colored dots indicate very confident classification. Relatively fewer sentences are lightly colored, indicating lower confidence of the model.

Probability Strategy

The BoW model 112 and the LSTM model 244 are trained (e.g., using backpropagation) to give a probability for each class (e.g., positive sentiment and negative sentiment) which indicates the confidence of the model prediction. For a binary classification, in one implementation, the probability has to be over 0.5, otherwise, the prediction is for the other sentiment class. For example, if BoW model 112 returns 1, it means it is very confident in its prediction. Thresholding means comparing the predicted probability by the model and assessing whether to use it or not. For example, a threshold of 0.7 means that sentiment classification of all sentences with a probability of 0.7 or above can be accepted. Another approach to analyze the results of the models is to look at the intervals such as the sentences that were correctly predicted in interval 0.5 to 0.55. This shows how accurate the predictions of a model are in this confidence range.

Figure 8A:
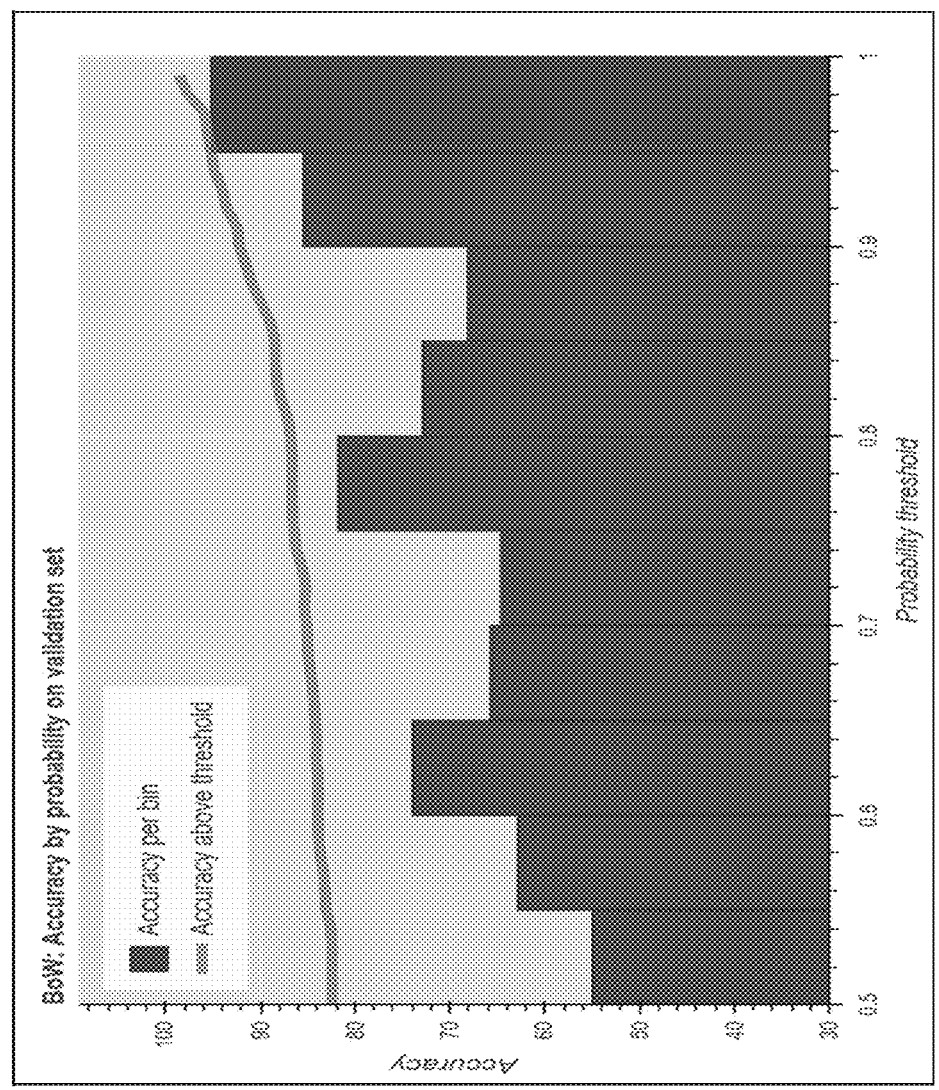
FIG. 8A is a graphical plot illustrating prediction accuracy of the BoW model of FIG. 6A in various probability intervals.

FIG. 8A is a plot 800A illustrating prediction accuracy of the BoW model 112 in various probability intervals between 0.5 and 1. The plot 800A shows that increasing the probability threshold increases the performance of the model. FIG. 8C is a similar plot 800C for the LSTM model 244. From the LSTM plot 800C it is not obvious that increasing the probability threshold increases the performance of the model. This is because LSTM model 244 can overfit the training data and provide only confident answers.

Using the probability threshold, the technology disclosed creates a "probability strategy". The output probability gives an indication when a sentence is easy and when it is in need of guidance from a computationally expensive model like the LSTM model 244. A threshold is applied to the probability of the BoW model 112. LSTM model 244 is applied on all sentences for which the probability of sentiment classification is less than the set threshold. Therefore, the BoW model 112 is used for linguistically easy sentences and the LSTM model 244 is used for linguistically complex sentences.

Figure 8B:
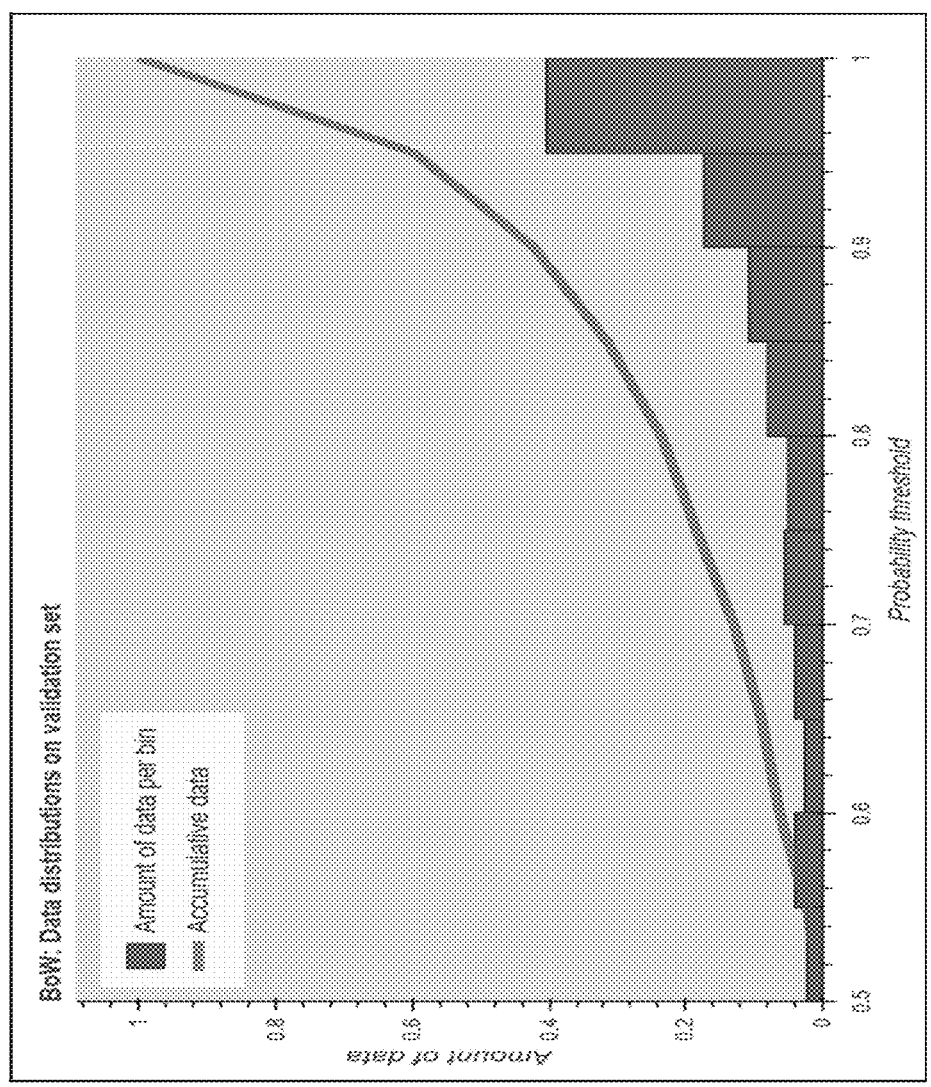
FIG. 8B is a graphical plot showing the amount of data per threshold bin for the BoW model.
Figure 8C:
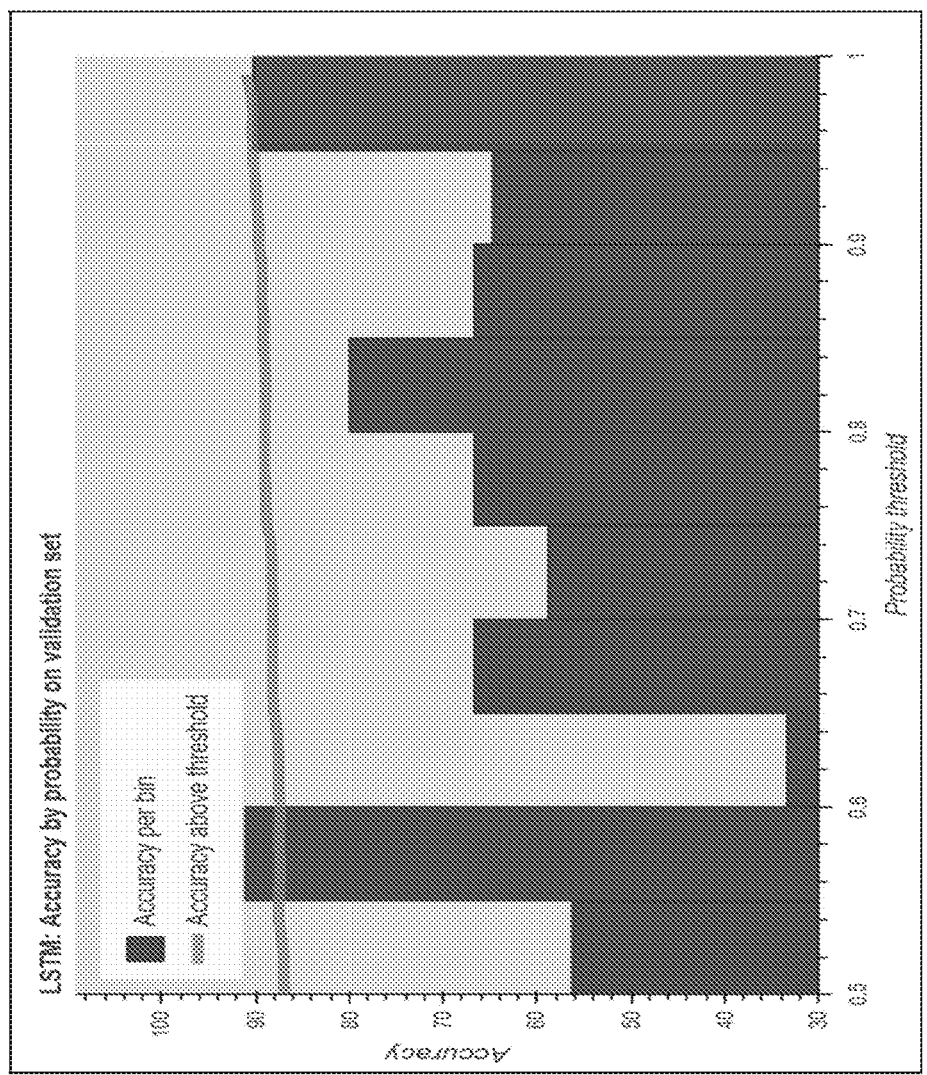
FIG. 8C is a graphical plot similar to FIG. 8A showing prediction accuracy of the LSTM model of FIG. 7A.
Figure 8D:
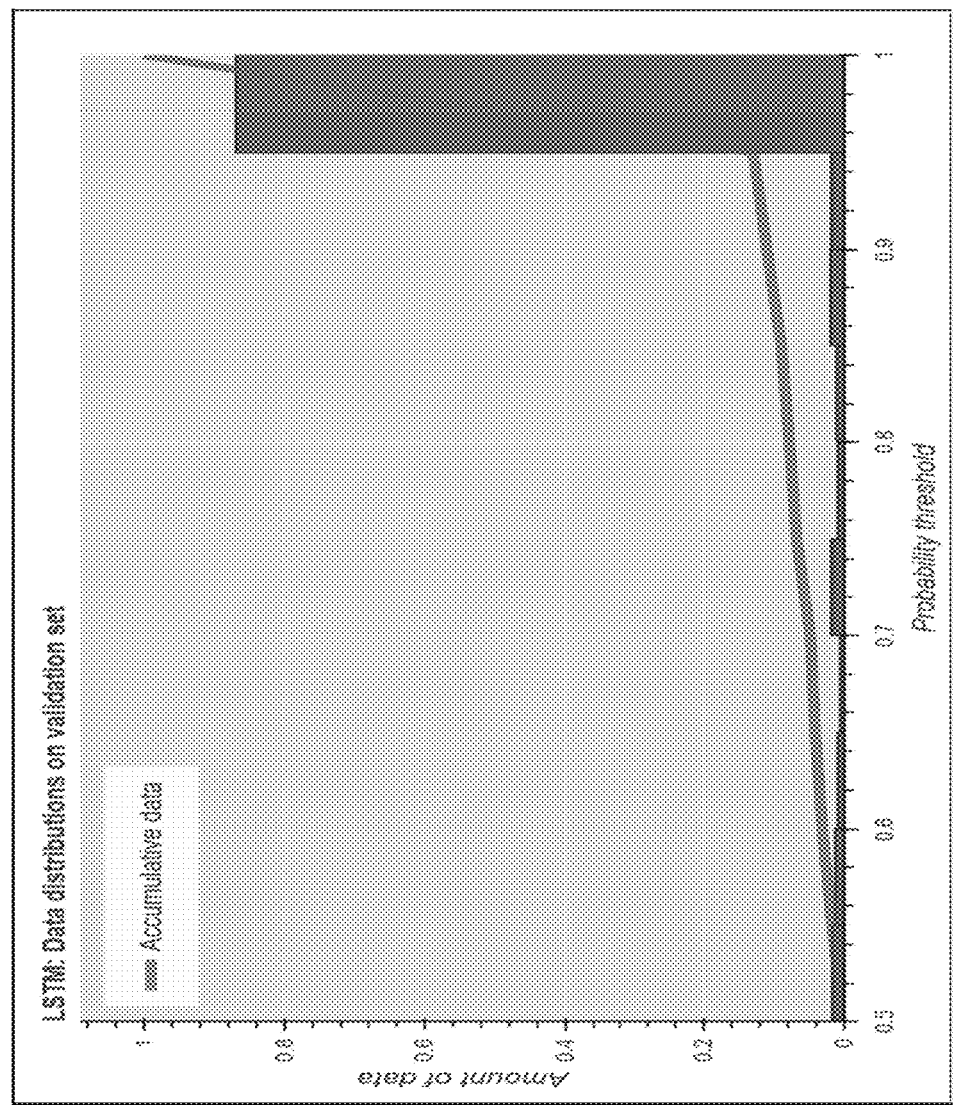
FIG. 8D is a graphical plot showing the amount of data per threshold bin for the LSTM model.

FIG. 8B and FIG. 8D are the data amount plots 800B and 800D respectively. The height of bars on these two plots show the amount of data within the two thresholds and the line on the top is accumulated data from each threshold bin.

System Overview—Deep Neural Network-Based Decision Network

Figure 9:
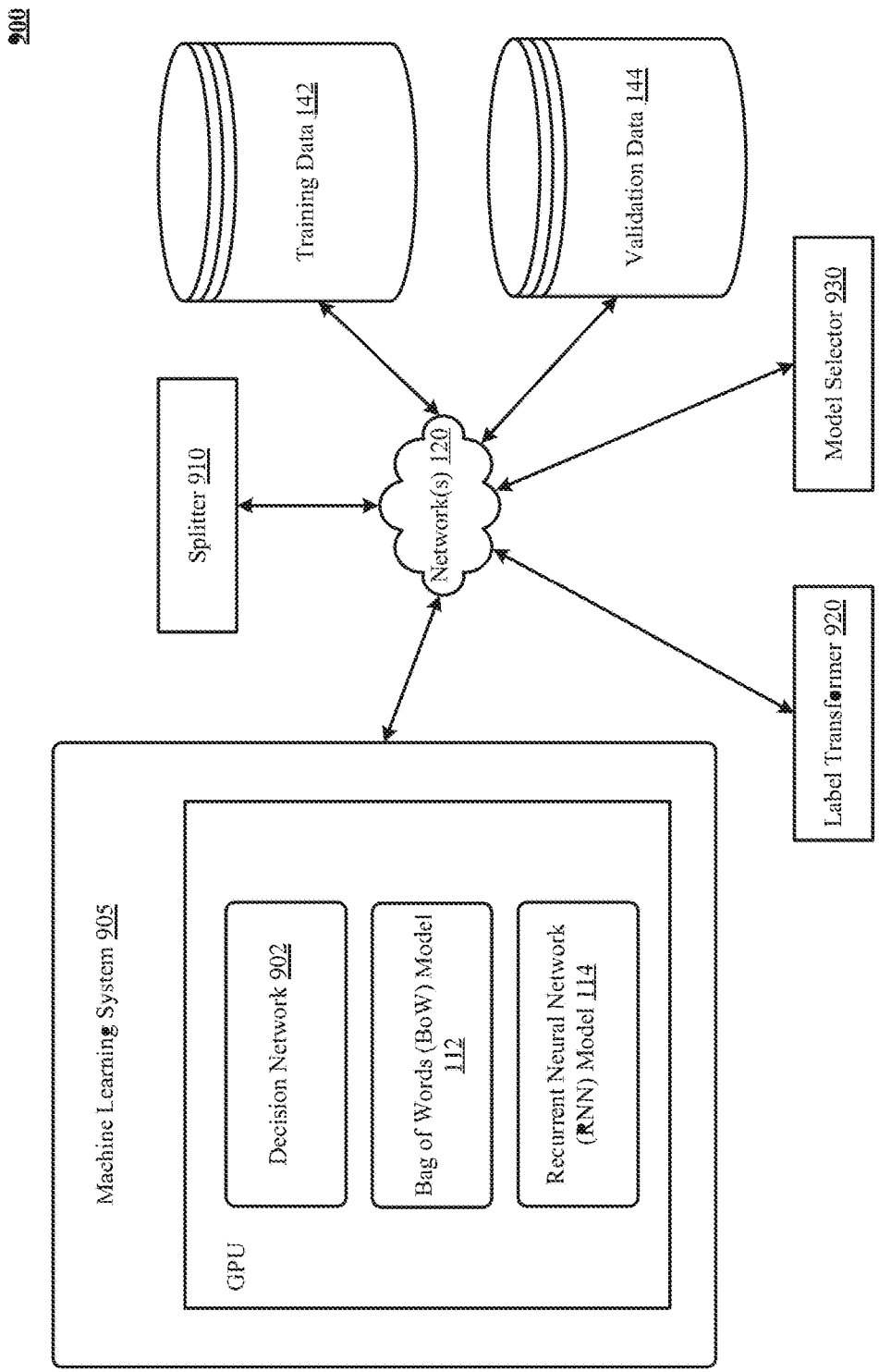
FIG. 9 illustrates an architectural level schematic of a system in which a decision network is used for selection of a machine learning model for performing a machine classification task. In one implementation, the machine classification task can be sentiment classification of a sentence. The sentiment classification task can comprise classifying a sentence as having a positive or negative sentiment. In other implementations, the sentiment classification task can comprise classifying the sentence as having a very positive, somewhat positive, neutral, very negative, or somewhat negative sentiment. In yet other implementations, additional, fewer, or different class labels can be used. In further implementations, other machine classification tasks can be used for training such as speech recognition, machine translation, text summarization, question answering, image captioning, and text-to-speech (TTS) synthesis.

We describe a system for a deep neural network-based decision network to select on an input-by-input basis, a neural network-based model (also referred to as a neural network-based classifier) to perform a machine classification task. The neural network-based model is selected from a pool of candidate neural network-based models (also referred to as neural network-based classifiers). The system and processes are described with reference to FIG. 9 showing an architectural level schematic of a system in accordance with an implementation. Because FIG. 9 is an architectural diagram, certain details are intentionally omitted to improve the clarity of the description.

The discussion of FIG. 9 is organized as follows. First, the elements of the figure are described, followed by their interconnections. Then, the use of the elements in the system is described in greater detail.

FIG. 9 includes the system 900. The system 900 includes machine learning system 905, a network 120, a training database 142, a validation database 144, a splitter 910, a label transformer 920, and a model selector 930. The machine learning system 905 includes a decision network 902, the bag of words (abbreviated BoW) model 112, and the recurrent neural network (abbreviated RNN) model 114. The training database 142 and the validation database 144 contain sentiment analysis data such as natural language sentences with positive and negative sentiment labels for each sentence. In other implementations, the system 100 also includes a testing database with testing data that is used to test the machine learning system 905 during inference (production or testing).

The decision network 902 is a neural network-based classifier that outputs probabilities to select either the BoW model 112 or the RNN model 114 to perform the sentiment classification task on the input sentences. The machine learning system 905, the training database 142, the validation database 144 and the splitter 910, the label transformer 920, and the model selector 930 are in communication with each other via the network(s) 120. After presenting a high level description of the system 900, the discussion now turns to detailed description of various components of the system 900.

Data Preparation

Figure 10:
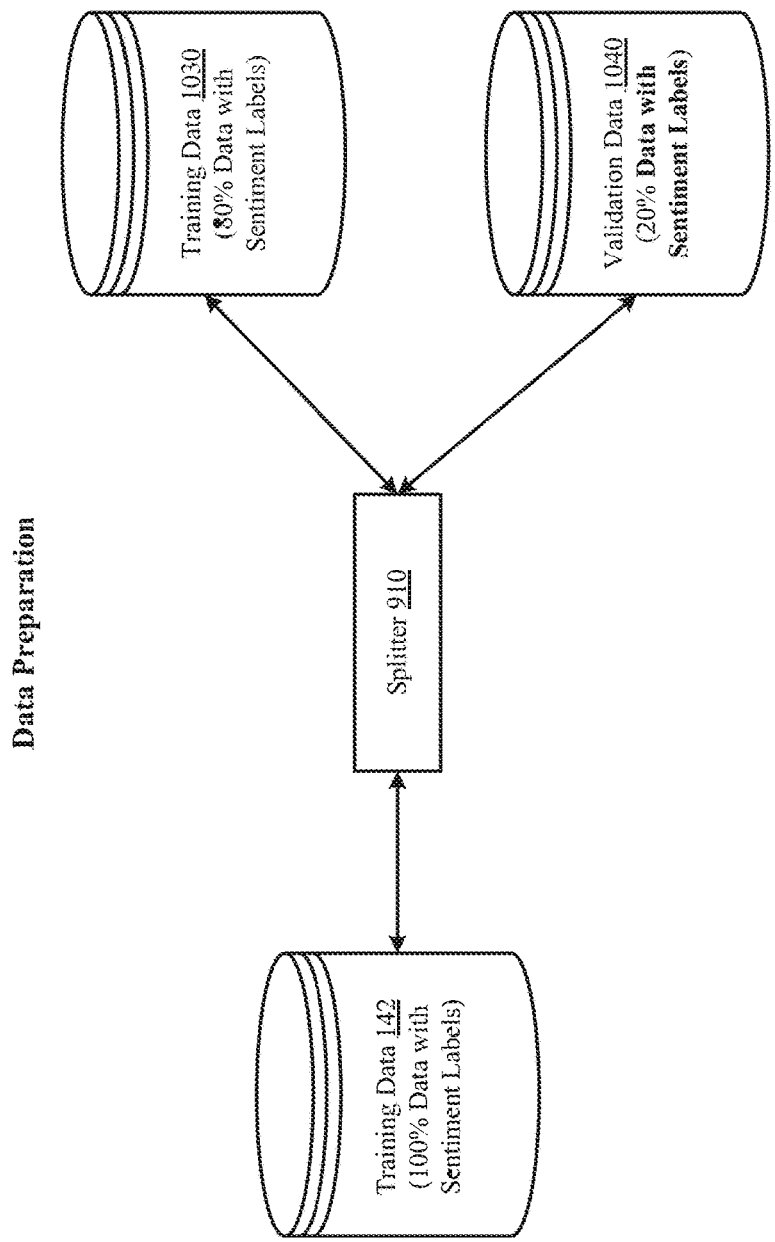
FIG. 10 illustrates the operation of a splitter of the system of FIG. 9 to create a training database and a validation database.

FIG. 10 shows the operation 1000 of the splitter 910 to create a training database 1030 and a validation database 1040. The training database 1030 and the validation database 1040 can be part of the single training database 142. In one implementation, the splitter 910 creates the training database 1030 and the validation database 1040 by assigning 80% of the data from the training database 142 to the training database 1030 and 20% of the training data from the training database 142 to the validation database 1040. In other implementations, the splitter 910 can assign the data to the training database 1030 and the validation database 1040 in different proportions than described above.

Model Training and Inference—Sentiment Analysis Task

Figure 11:
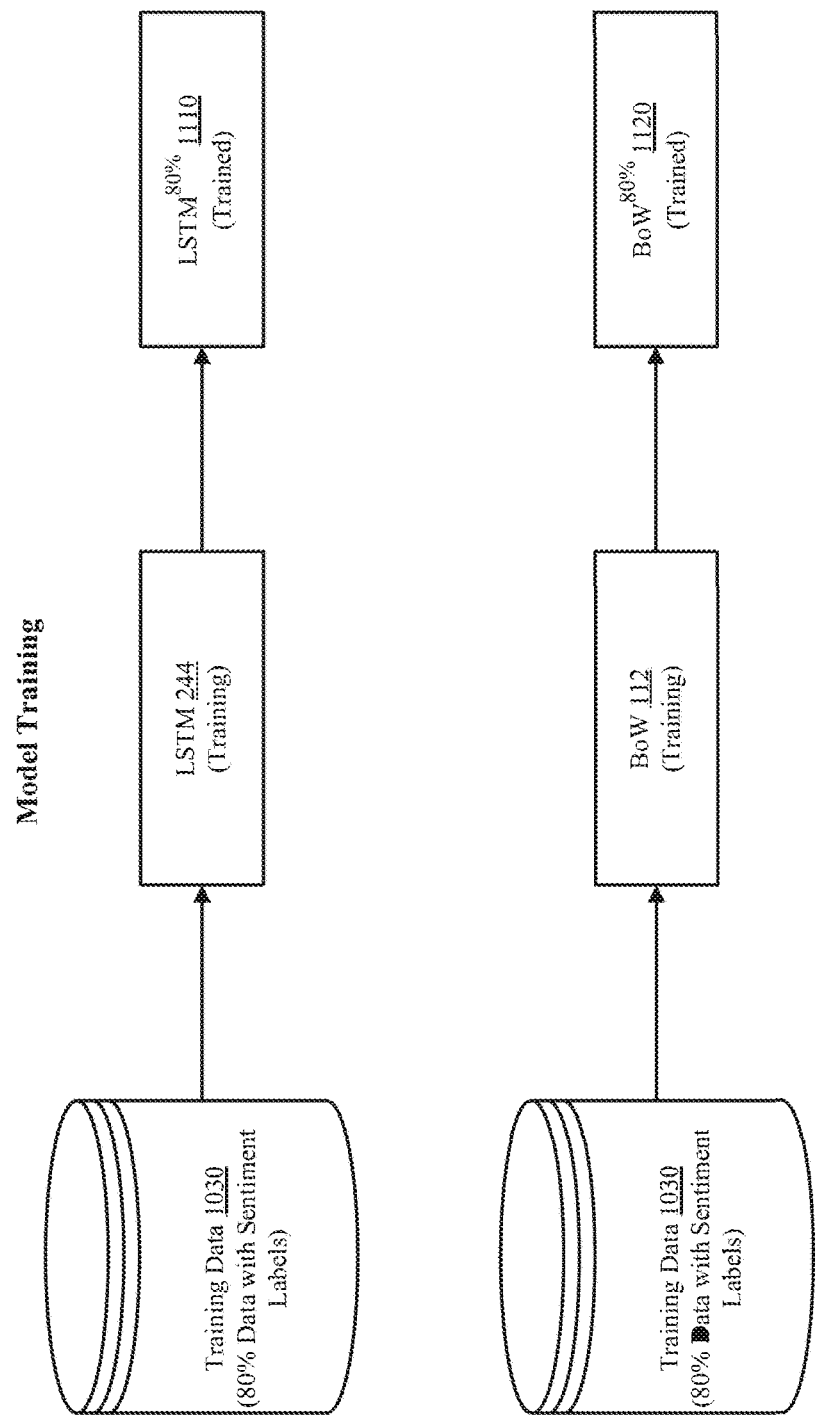
FIG. 11 shows training of the candidate neural network models using the training database generated by the splitter as shown in FIG. 10.

FIG. 11 illustrates training 1100 of the neural-network based models in the candidate pool of neural network models to perform the classification task using a training set. In one implementation, the classification task can be sentiment classification of a sentence. The sentiment classification task can comprise classifying a sentence as having a positive or negative sentiment. In other implementations, the sentiment classification task can comprise classifying the sentence as having a very positive, somewhat positive, neutral, very negative, or somewhat negative sentiment. In yet other implementations, additional, fewer, or different class labels can be used. In further implementations, other classification tasks can be used for training such as speech recognition, machine translation, text summarization, question answering, image captioning, and text-to-speech (TTS) synthesis.

The training database 1030 contains sentences with sentiment labels that are used to separately train the LSTM model 244 and the BoW model 112. In one implementation, the LSTM model 244 and the BoW model 112 are separately trained using the training database 1030 that contains 80% of the training data from the training database 142 (e.g., using backpropagation). The models are trained on the machine classification task. In one implementation, the machine classification task is sentiment classification and the inputs are sentences. Each input sentence in the training data 1030 can have a task label that indicates whether the sentence has a positive sentiment or a negative sentiment. In one implementation, the resulting trained models are referred to herein as $LSTM^{80\%}$ 1110 and $BoW^{80\%}$ 1120 because they are trained on 80% of the training data.

Figure 12:
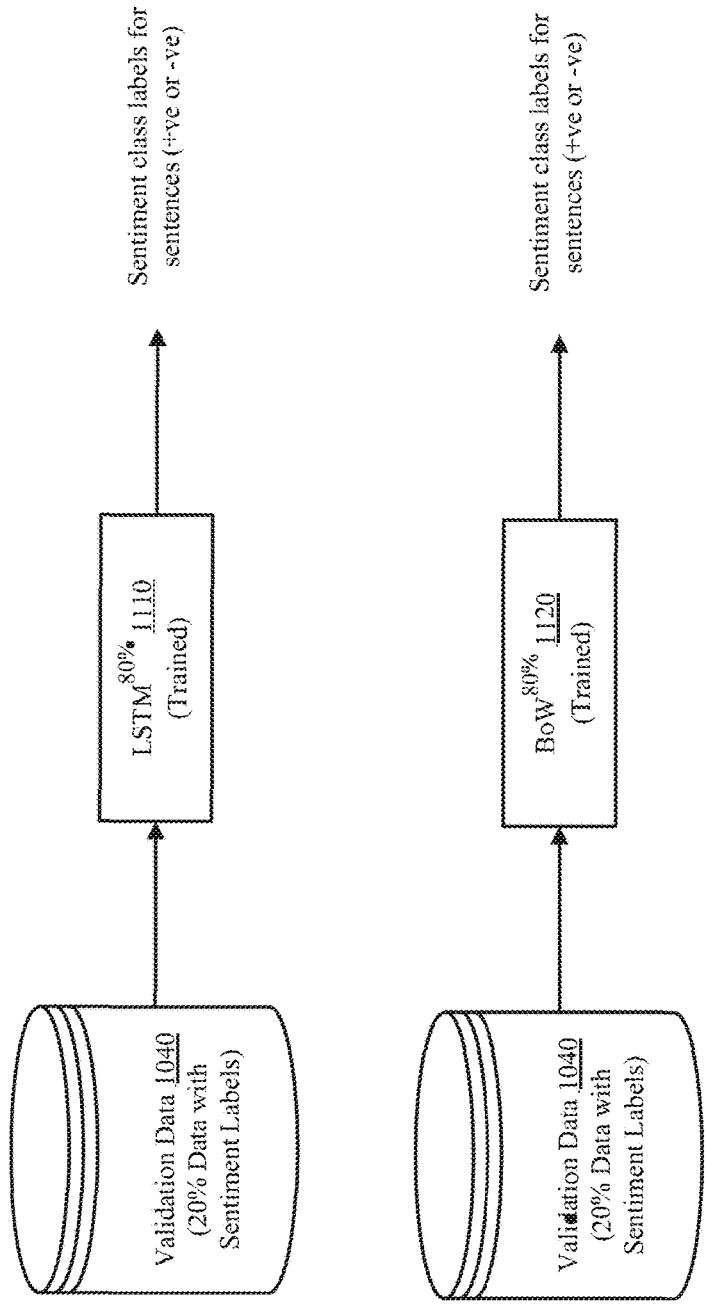
FIG. 12 shows testing of the trained neural network models using validation data generated by the splitter as shown in FIG. 10.

The trained models $LSTM^{80\%}$ 1110 and $BoW^{80\%}$ 1120 are tested with validation data 1040 separately. The validation data 1040 contains a portion of the data from the training database 142 that was not used to train and produce the $LSTM^{80\%}$ 1110 and $BoW^{80\%}$ 1120. In one implementation, the validation data contains 20% of the data from the training database 142. As shown in FIG. 12, the trained models $LSTM^{80\%}$ 1110 and $BoW^{80\%}$ 1120 generate sentiment class labels 1200 for each input sentence. The inferred sentiment class labels (either positive or negative) 1200 for each input sentence are compared with the respective ground truth sentiment class labels.

Confusion Matrix

Figure 13:
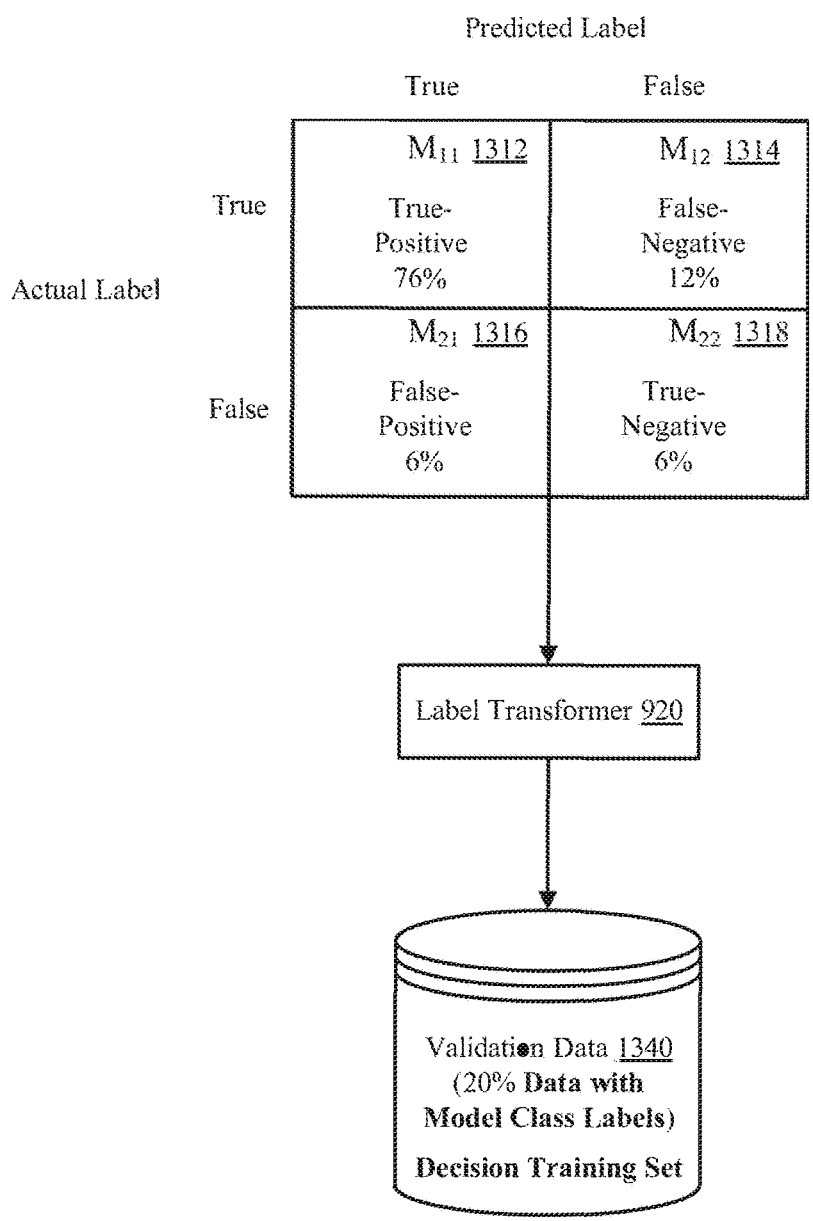
FIG. 13 illustrates the operation of the label transformer of the system in FIG. 9 using the confusion matrix to generate validation data with new model class labels replacing the task class labels.

The results of comparison of inferred sentiment class labels with ground truth sentiment class labels are used to generate 1300 a "confusion matrix" 1310, as shown in FIG. 13. Confusion matrix is a metric for accurately evaluating classification models. For a classification problem with C classes, the confusion matrix M is a C×C matrix where elements $M_{ij}$ in this matrix show the percentage of samples whose actual class labels are i but they are classified under class j using the neural network classifier. $M_{ij}$ shows the percentage of samples which are correctly classified. For binary classification problems in which there are two classes, the confusion matrix is a 2×2 matrix 1310 as shown in FIG. 13.

Element $M_{11}$ 1312 of the confusion matrix 1310 shows the percentage of samples whose actual labels are "true" and they are correctly classified as "true" during prediction. Element $M_{11}$ 1312 comprises 76% true-positive (TP) samples. Element $M_{12}$ 1314 of the confusion matrix 1310 shows the percentage of samples whose actual label is "true" but they are incorrectly classified as "false" during prediction. Element $M_{12}$ 1314 comprises 12% false-negative (FN) samples. Element $M_{21}$ 1316 of the confusion matrix 1310 shows the percentage of samples whose actual label is "false" but they are incorrectly classified as "true" during prediction. Element $M_{21}$ 1316 comprises 6% false-positive (FP) samples. Element $M_{22}$ 1318 of the confusion matrix 1310 shows the percentage of samples whose actual label is "false" and they are correctly classified as "false" during prediction. Element $M_{22}$ 1318 comprises 6% true-negative (TN) samples.

Classification results generated by the trained models $LSTM^{80\%}$ 1110 and $BoW^{80\%}$ 1120 on validation data 1040 (FIG. 12) can be plotted in two separate confusion matrices, according to one implementation. The results from both confusion matrices for the two classifiers, $LSTM^{80\%}$ 1110 and $BoW^{80\%}$ 1120, can also be combined in a single confusion matrix 1310. The resulting confusion matrix 1310 identifies:

Inputs in validation database 1040 accurately classified by both the trained recurrent neural network-based classifier $LSTM^{80\%}$ 1110 and the trained non-recurrent neural network-based classifier $BoW^{80\%}$ 1120 (true-positive, top left). This means that the LSTM and the BoW models are both correct 76% of the time.

Inputs in validation database 1040 inaccurately classified by both the trained recurrent neural network-based classifier $LSTM^{80\%}$ 1110 and the trained non-recurrent neural network-based classifier $BoW^{80\%}$ 1120 (true-negative, bottom right). This means that the LSTM and the BoW models are both incorrect 6% of the time.

Inputs in validation database 1040 accurately classified by the trained non-recurrent neural network-based classifier $BoW^{80\%}$ 1120 but inaccurately classified by the trained recurrent neural network-based classifier $LSTM^{80\%}$ 1110 (false-positive, bottom left). This means that, when the LSTM model is incorrect, the BoW model is correct 6% of the time.

Inputs in validation database 1040 accurately classified by the trained recurrent neural network-based classifier LSTM$^{80\%}$ 1110 but inaccurately classified by the trained non-recurrent neural network-based classifier BoW$^{80\%}$ 1120 (false-negative, top right). This means that, when the BoW model is incorrect, the LSTM model is correct 12% of the time.

The label transformer 920 assigns new labels to inputs in the validation database 1040 and generates a new validation database 1340. In one implementation, the label transformer 920 groups the inputs in validation database 1040 into two subsets in the new validation database 1340. A first subset of inputs is assigned a first model class label identifying the trained recurrent neural network-based classifier LSTM$^{80\%}$ 1110. A second subset of inputs is assigned a second model class label identifying the trained non-recurrent neural network-based classifier BoW$^{80\%}$ 1120.

The first subset of inputs in the validation data 1340 includes inputs in validation database 1040 accurately classified by the trained recurrent neural network-based classifier LSTM$^{80\%}$ 1110 but inaccurately classified by the trained non-recurrent neural network-based classifier BoW$^{80\%}$ 1120. The second subset of inputs in the validation data 1340 includes the inputs in validation database 1040 in remaining three categories from the confusion matrix 1310. These inputs include: inputs in validation database 1040 accurately classified by both the trained recurrent neural network-based classifier LSTM$^{80\%}$ 1110 and the trained non-recurrent neural network-based classifier BoW$^{80\%}$ 1120, inputs in validation database 1040 inaccurately classified by both the trained recurrent neural network-based classifier LSTM$^{80\%}$ 1110 and the trained non-recurrent neural network-based classifier BoW$^{80\%}$ 1120, and inputs in validation database 1040 accurately classified by the trained non-recurrent neural network-based classifier BoW$^{80\%}$ 1120 but inaccurately classified by the trained recurrent neural network-based classifier LSTM$^{80\%}$ 1110. The new model class labeled input data is stored in the validation database 1340. The data in the validation database 1340 is also referred to as a decision set. In another implementation, the label transformer 920 adds model class labels to inputs in the existing validation database 1040. This results in the inputs having two labels each—a task class label, identifying a positive or a negative sentiment and a model class label, identifying a trained recurrent neural network-based classifier LSTM$^{80\%}$ 1110 or a trained non-recurrent neural network-based classifier BoW$^{80\%}$ 1120.

In some implementations, the original validation data is not replicated to form the new validation data and instead each data item in the validation data is assigned and stored with two ground truth pointers; one for the sentiment class label and one for the model class label. In yet other implementations, two copies of the validation data are maintained with separate and different ground truth labels (one for the sentiment class label and one for the model class label).

Decision Network

Figure 14:
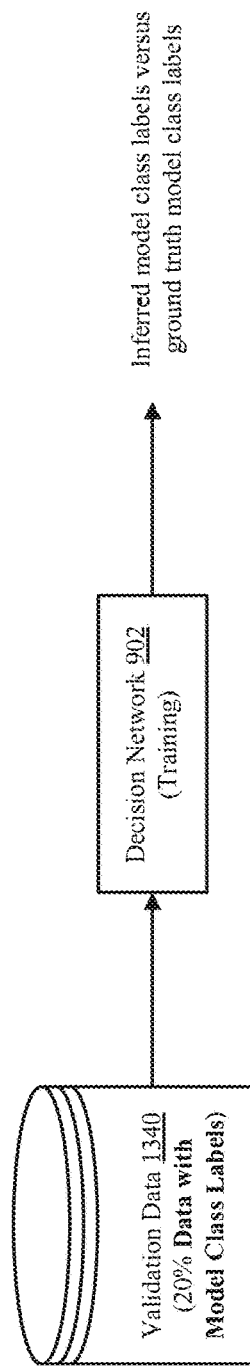
FIG. 14 illustrates training of the decision network of FIG. 9 using the validation data with new model class labels.

FIG. 14 shows training 1400 of the decision network (also referred to herein as decision classifier) 902 using inputs with model class labels in the validation database 1340. The outputs of the decision network 902 are inferred model class labels for each input sentence in the validation database 1340. The inferred model class label for each sentence by the decision network 902 is compared to ground truth model class label for that sentence in the validation data 1340.

Figure 15:
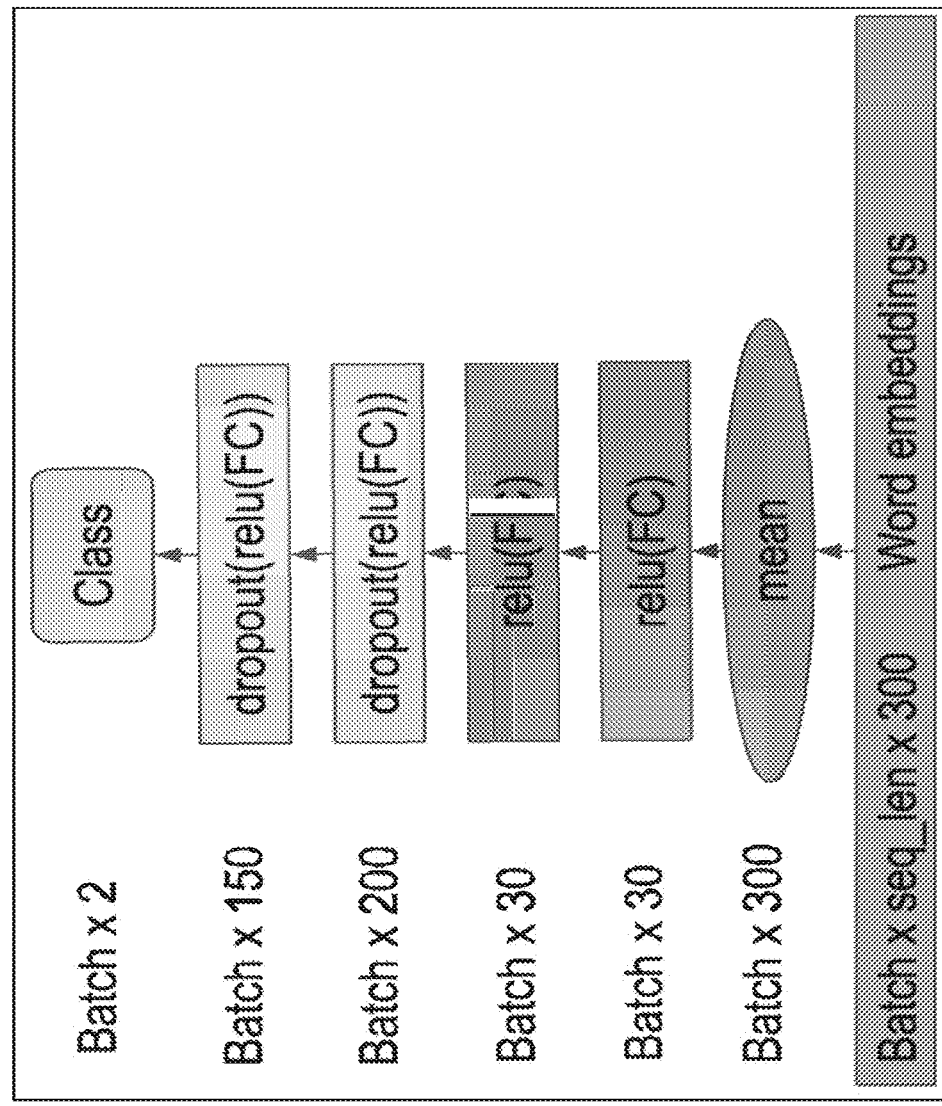
FIG. 15 shows an example architecture of a decision network of FIG. 9.

FIG. 15 illustrates one implementation of architecture 1500 of the decision network 902. In other implementations, any other conventional or future-developed BoW, RNN, or LSTM architectures can be used herein. Such implementations will be readily apparent to those skilled in the art without departing from the spirit and scope of the technology disclosed.

In one implementation, the decision network 902 comprises the trained non-recurrent neural network-based classifier BoW$^{80\%}$ 1120 with the original classification layer removed from the architecture as shown in FIG. 902. One implementation of the architecture of the original BoW model 112 is shown in FIG. 4. The new classification layer in the decision network 902 classifies in the input sentences using the model class labels and produces output probabilities for the first and second model class labels. In the implementation described above, these probabilities correspond to LSTM$^{80\%}$ 1110 and BoW$^{80\%}$ 1120. Additionally, two fully-connected layers with ReLU are included in the decision network 902.

In some implementations, during training of the decision network 902, gradients only for the fully-connected layers and the new classification layer are backpropagated. The weights of the trained non-recurrent neural network-based classifier BoW$^{80\%}$ 1120 are kept fixed and remain unchanged.

Process Flow

Figure 16:
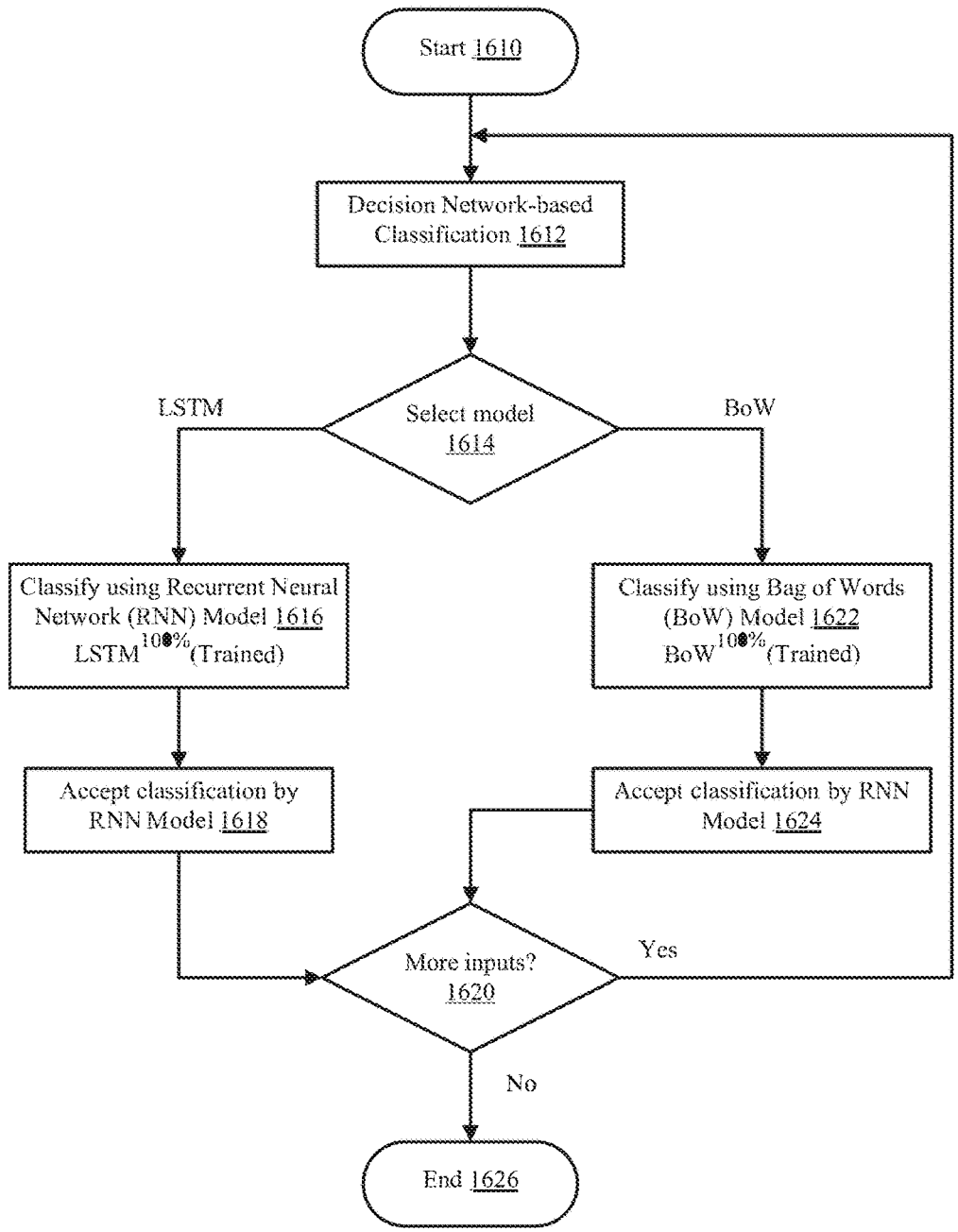
FIG. 16 is a flowchart illustrating process steps for model selection using decision network of FIG. 9.

FIG. 16 is a flowchart 1600 illustrating process steps for model selection using decision network of FIG. 9. The process starts at step 1610 when a sentence is given as input to the decision network 902. The decision network 902 then generates a model classification at step 1612. At step 1614, either the LSTM model or the BoW model is selected based on the classification by the decision network 902 at step 1612.

If the LSTM model is selected at step 1614, then the sentence is provided to the LSTM$^{100\%}$ model for sentiment classification. LSTM$^{100\%}$ is trained on the entire training data 142, which in turn comprises the training data 1030 and the validation data 1040. At step 1616, the LSTM$^{100\%}$ produces a sentiment classification for the sentence. At step 1618, sentiment classification of the LSTM$^{100\%}$ is accepted.

If the BoW model is selected at step 1614, then the sentence is provided to the BoW$^{100\%}$ model for sentiment classification. BoW$^{100\%}$ is trained on the entire training data 142, which in turn comprises the training data 1030 and the validation data 1040. At step 1622, the BoW$^{100\%}$ produces a sentiment classification for the sentence. At step 1624, sentiment classification of the BoW$^{100\%}$ is accepted.

At step 1620, the system checks if there are more input sentences for sentiment classification. If this is true, then the next sentence is given as input to the decision network 902 and the process is repeated. The process ends at step 1626 when there are no further input sentences for sentiment classification.

Computer System

Figure 17:
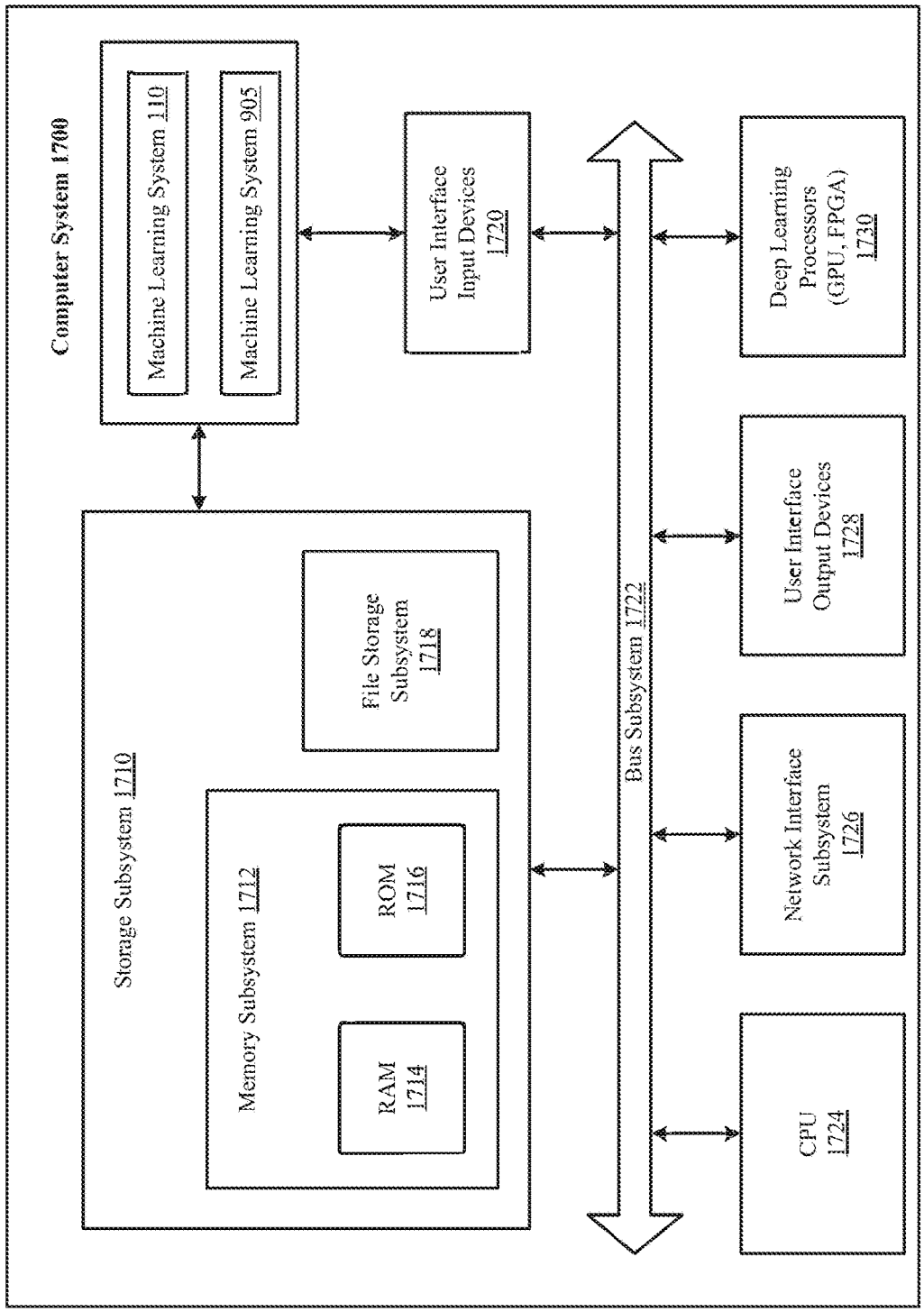
FIG. 17 is a simplified block diagram of a computer system that can be used to implement the machine learning system of FIG. 1 and FIG. 9.

FIG. 17 is a simplified block diagram of a computer system 1700 that can be used to implement the machine learning systems 110 and 905 of FIG. 1 and FIG. 9. Computer system 1700 includes at least one central processing unit (CPU) 1724 that communicates with a number of peripheral devices via bus subsystem 1722. These peripheral devices can include a storage subsystem 1710 including, for example, memory devices and a file storage subsystem 1718, user interface input devices 1720, user interface output devices 1728, and a network interface subsystem 1726. The input and output devices allow user interaction with computer system 1700. Network interface subsystem 1726 provides an interface to outside networks, including an interface to corresponding interface devices in other computer systems.

In one implementation, the machine learning system 110 of FIG. 1 and the machine learning system 905 of FIG. 9 are communicably linked to the storage subsystem 1710 and the user interface input devices 1720.

User interface input devices 1720 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1700.

User interface output devices 1728 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1700 to the user or to another machine or computer system.

Storage subsystem 1710 stores programming and data constructs that provide the functionality of some or all of the modules and methods described herein. These software modules are generally executed by deep learning processors 1730.

Deep learning processors 1730 can be graphics processing units (GPUs) or field-programmable gate arrays (FPGAs). Deep learning processors 1730 can be hosted by a deep learning cloud platform such as Google Cloud Platform™, Xilinx™, and Cirrascale™. Examples of deep learning processors 1730 include Google's Tensor Processing Unit (TPU)™, rackmount solutions like GX4 Rackmount Series™, GX8 Rackmount Series™, NVIDIA DGX-1™, Microsoft' Stratix V FPGA™, Graphcore's Intelligent Processor Unit (IPU)™, Qualcomm's Zeroth Platform™ with Snapdragon Processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, and others.

Memory subsystem 1712 used in the storage subsystem 1710 can include a number of memories including a main random access memory (RAM) 1714 for storage of instructions and data during program execution and a read only memory (ROM) 1716 in which fixed instructions are stored. A file storage subsystem 1718 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1718 in the storage subsystem 1710, or in other machines accessible by the processor.

Bus subsystem 1722 provides a mechanism for letting the various components and subsystems of computer system 1700 communicate with each other as intended. Although bus subsystem 1722 is shown schematically as a single bus, alternative implementations of the bus subsystem can use multiple busses.

Computer system 1700 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1700 depicted in FIG. 17 is intended only as a specific example for purposes of illustrating the preferred embodiments of the present invention. Many other configurations of computer system 1700 are possible having more or less components than the computer system depicted in FIG. 17.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

Particular Implementations

Probability-Based Guider

The technology disclosed relates to efficient performance of a machine classification task on a dataset comprising a plurality of inputs. In one implementation, the machine classification task can be sentiment classification of a sentence. The sentiment classification task can comprise classifying a sentence as having a positive or negative sentiment. In other implementations, the sentiment classification task can comprise classifying the sentence as having a very positive, somewhat positive, neutral, very negative, or somewhat negative sentiment. In yet other implementations, additional, fewer, or different class labels can be used. In further implementations, other machine classification tasks can be performed such as speech recognition, machine translation, text summarization, question answering, image captioning, and text-to-speech (TTS) synthesis.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

A first system implementation of the technology disclosed includes one or more processors coupled to the memory. The memory is loaded with computer instructions to efficiently perform a machine classification task on a dataset comprising a plurality of input. The system processes the input through a first non-recurrent neural network which performs the machine classification task on the inputs. The first non-recurrent neural network generates a mean vector representation of an input by averaging vector embeddings of the input. The system then processes a selected subset of inputs through a second recurrent neural network (abbreviated RNN) to perform the machine classification task on the inputs in the subset. The selection for further processing is conditioned on the first non-recurrent neural network's confidence in performing the machine classification task on the inputs in the dataset.

The first system implementation and other systems disclosed optionally include one or more of the following features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

The second RNN included in the system is at least three percent more accurate and four times computationally more expensive than the first non-recurrent neural network. The system selects the second RNN when the first non-recurrent neural network's confidence is below a set threshold. The machine classification task is to classify an input to a first class or a second class. The first non-recurrent neural network's confidence represents a probability score assigned to either the first class or the second class. The input is a sentence and the machine classification task is to classify the sentence to a positive sentiment class or a negative sentiment class.

The first non-recurrent neural network included in the system produces a probability score for a linguistically complex sentence which is at least twenty percent lower than a class probability produced by the first non-recurrent neural network for a linguistically simple sentence.

The system includes a second RNN which is used to classify a linguistically complex sentence to the positive sentiment class or the negative sentiment class. In one implementation, the first non-recurrent neural network included in the system is a bag of words (abbreviated BoW) network. In another implementation the first non-recurrent neural network is at least one continuous bag of words (abbreviated CBoW) network. In another implementation, the first non-recurrent neural network is at least one skip-gram network. In yet another implementation, the first non-recurrent neural network is at least one convolutional neural network (abbreviated CNN). In another implementation, the second RNN is a long short-term memory (abbreviated LSTM) network. In another implementation, the second RNN is a gated recurrent unit (abbreviated GRU) network. In yet another implementation, the second RNN is a quasi-recurrent neural network (abbreviated QRNN).

In one implementation, the system includes a threshold that is a single value. In another implementation, the system includes a threshold that is a range between two values.

In one implementation, the machine classification task is a part-of-speech (abbreviated POS) tagging. In another implementation, the machine classification task is chunking. In another implementation, the machine classification task is dependency parsing. In another implementation, the machine classification task is semantic relatedness. In yet another implementation, the machine classification task is textual entailment.

Examples of some machine classification tasks that can be performed by the technology disclosed include speech recognition, machine translation, text summarization, question answering, image captioning, and text-to-speech (TTS) synthesis.

A second system implementation of the technology disclosed includes one or more processors coupled to the memory. The memory is loaded with computer instructions to efficiently perform a sentiment classification task on a sentence. The system comprises a first non-recurrent neural network that evaluates the sentence and produces a confidence score. This score specifies a likelihood of the sentence's sentiment being positive or negative. The first non-recurrent neural network generates a mean vector representation of an input by averaging vector embeddings of the input. The system further comprises of a guider that compares the confidence score produced by the first non-recurrent neural network against a set threshold. Based on this comparison the guider determines, whether the sentence requires supplemental evaluation by a second recurrent neural network (abbreviated RNN). The supplemental evaluation includes when the confidence score is below the threshold, using the second RNN to classify the sentence's sentiment as positive or negative. When the confidence score is above the threshold, relying on the confidence score produced by the first non-recurrent neural network for the sentiment classification task without requiring the supplemental evaluation by the second RNN.

The second system implementation and other systems disclosed optionally include one or more of the following features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

The first non-recurrent neural network in the system produces a twenty percent lower confidence score when the sentence is a linguistically complex sentence compared to when the sentence is a linguistically simple sentence. In such an implementation, the linguistically complex sentence has co-occurrences of negative and positive constituents. In another such implementation, the linguistically complex sentence has multiple instances of negative words and contrastive conjunctions. In another such implementation, the system includes using the second RNN to classify the linguistically complex sentence's sentiment as positive or negative.

Each of the features discussed in this particular implementation section for the first system implementation apply equally to the second system implementation. As indicated above, all the system features are not repeated here and should be considered repeated by reference.

Other implementations may include a non-transitory computer readable storage medium storing instructions executable by a processor to perform functions of the system described above. Yet another implementation may include a method performing the functions of the system described above.

A third system implementation of the technology disclosed includes more than one processors operating in parallel and coupled to memory. The memory is loaded with computer instructions to efficiently perform a machine classification task on a dataset comprising a plurality of inputs. The instructions upon execution on the processors implement the actions comprising processing the inputs through a first non-recurrent neural network which performs the machine classification task on the inputs. The processing by the first non-recurrent neural network generates a mean vector representation of an input by averaging vector embeddings of the input.

Following this, the system processes a selected subset of inputs through a second recurrent neural network (abbreviated RNN) to perform the machine classification task on the inputs in the subset. The selection of the inputs for further processing is conditioned on the first non-recurrent neural network's confidence in performing the machine classification task on the inputs in the dataset.

Each of the features discussed in this particular implementation section for the first and the second system implementation apply equally to the third system implementation. As indicated above, all the system features are not repeated here and should be considered repeated by reference.

Other implementations may include a non-transitory computer readable storage medium storing instructions executable by a processor to perform functions of the system described above. Yet another implementation may include a method performing the functions of the system described above.

A first method implementation of the technology disclosed includes efficiently performing a machine classification task on a dataset comprising a plurality of inputs. The method includes, processing the inputs through a first non-recurrent neural network which performs the machine classification task on the inputs. The first non-recurrent neural network generates a mean vector representation of an input by averaging vector embeddings of the input. The method then processes a selected subset of inputs through a second recurrent neural network (abbreviated RNN) to perform the machine classification task on the inputs in the subset. The selection for further processing is conditioned on the first non-recurrent neural network's confidence in performing the machine classification task on the inputs in the dataset.

Each of the features discussed in this particular implementation section for the first system implementation apply equally to this method implementation. As indicated above, all the system features are not repeated here and should be considered repeated by reference.

Other implementations may include a non-transitory computer readable storage medium storing instructions executable by a processor to perform the first method described above. Yet another implementation may include a system including memory and one or more processors operable to execute instructions, stored in the memory, to perform the first method described above.

Computer readable media (CRM) implementations of the technology disclosed include a non-transitory computer readable storage medium impressed with computer program instructions, when executed on a processor, implement the method described above.

Each of the features discussed in this particular implementation section for the first system implementation apply equally to the CRM implementation. As indicated above, all the system features are not repeated here and should be considered repeated by reference.

A second method implementation of the technology disclosed includes efficiently perform a sentiment classification task on a sentence. The method includes evaluating a sentence using a first non-recurrent neural network and producing a confidence score which specifies a likelihood of the sentence's sentiment being positive or negative. The method includes generating a mean vector representation of an input by averaging vector embeddings of the input by the first non-recurrent neural network. Following this, the method includes using a guider to compares the confidence score produced by the first non-recurrent neural network against a set threshold. Based on this comparison, the method includes, determining whether the sentence requires supplemental evaluation by a second recurrent neural network (abbreviated RNN). The method further includes, based on this evaluation, using the second RNN to classify the sentence's sentiment as positive or negative when the confidence score is below the threshold. The method includes relying on the confidence score produced by the first non-recurrent neural network for the sentiment classification task, without requiring the supplemental evaluation by the second RNN when the confidence score is above the threshold.

Each of the features discussed in this particular implementation section for the second system implementation apply equally to this method implementation. As indicated above, all the system features are not repeated here and should be considered repeated by reference.

Other implementations may include a non-transitory computer readable storage medium storing instructions executable by a processor to perform the second method described above. Yet another implementation may include a system including memory and one or more processors operable to execute instructions, stored in the memory, to perform the second method described above.

Computer readable media (CRM) implementations of the technology disclosed include a non-transitory computer readable storage medium impressed with computer program instructions, when executed on a processor, implement the method described above.

Each of the features discussed in this particular implementation section for the second system implementation apply equally to the CRM implementation. As indicated above, all the system features are not repeated here and should be considered repeated by reference.

A third method implementation of the technology disclosed includes efficiently perform a machine classification task on a dataset comprising a plurality of inputs. The method further includes processing the inputs through a first non-recurrent neural network which performs the machine classification task on the inputs, wherein the first non-recurrent neural network generates a mean vector representation of an input by averaging vector embeddings of the input. Following this, the method includes further processing a selected subset of inputs through a second recurrent neural network (abbreviated RNN) to perform the machine classification task on the inputs in the subset.

The selection for further processing is conditioned on the first non-recurrent neural network's confidence in performing the machine classification task on the inputs in the dataset.

Each of the features discussed in this particular implementation section for the third system implementation apply equally to this method implementation. As indicated above, all the system features are not repeated here and should be considered repeated by reference.

Other implementations may include a non-transitory computer readable storage medium storing instructions executable by a processor to perform the third method described above. Yet another implementation may include a system including memory and one or more processors operable to execute instructions, stored in the memory, to perform the third method described above.

Computer readable media (CRM) implementations of the technology disclosed include a non-transitory computer readable storage medium impressed with computer program instructions, when executed on a processor, implement the method described above.

Each of the features discussed in this particular implementation section for the third system implementation apply equally to the CRM implementation. As indicated above, all the system features are not repeated here and should be considered repeated by reference.

Deep Neural Network-Based Decision Network

The technology disclosed relates to efficient performance of a machine classification task on a dataset comprising a plurality of inputs.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

A first system implementation of the technology disclosed includes one or more processors coupled to the memory. The memory is loaded with computer instructions to select on an input-by-input basis, a neural network-based classifier from a pool of candidate neural network-based classifiers to perform a machine classification task in a manner that maximizes accuracy and minimizes computational cost. The system performs the training of the candidate neural network-based classifiers in the pool, to perform the machine classification task, using a training set. The training set comprises training inputs annotated with task class labels defined for the machine classification task. The system then uses the trained candidate neural network-based classifiers to perform the machine classification task on a validation set. The validation set is comprised of validation inputs annotated with the task class labels. The system then generates a confusion matrix based on the trained neural network-based classifiers' performance. The system then uses the confusion matrix to identify a first subset of validation inputs accurately inferred only by a particular trained recurrent neural network-based classifier in the pool and a second subset of validation inputs comprising validation inputs not in the first subset. The system then labels the validation inputs in the first subset with a first model class label identifying the particular trained recurrent neural network-based classifier. The system labels the validation inputs in the second subset with a second model class label identifying a particular trained non-recurrent neural network-based classifier in the pool. The system stores the model-class-labeled validation inputs in the first and second subsets as a decision set.

The first system implementation and other systems disclosed optionally include one or more of the following features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

The system performs the machine classification task for a given input during inference, based on output probabilities of the trained neural network-based decision classifier using either the particular trained recurrent neural network-based classifier or the particular trained non-recurrent neural network-based classifier. The system selects the particular trained recurrent neural network-based classifier when the output probability of the first model class label is higher than that of the second model class label. The system selects the particular trained non-recurrent neural network-based classifier when the output probability of the second model class label is higher than that of the first model class label.

In one implementation of the system, the particular trained recurrent neural network-based classifier is at least three percent more accurate and four times computationally more expensive than the particular trained non-recurrent neural network-based classifier. In one such implementation, the particular trained recurrent neural network-based classifier is at least one recurrent neural network (abbreviated RNN). In another implementation, the particular trained non-recurrent neural network-based classifier is at least one bag of words (abbreviated BoW) network. In another such implementation, the particular trained non-recurrent neural network-based classifier is at least one continuous bag of words (abbreviated CBoW) network. In another implementation, the particular trained non-recurrent neural network-based classifier is at least one skip-gram network. In one implementation, the particular trained non-recurrent neural network-based classifier is at least one convolutional neural network (abbreviated CNN). In one implementation, the RNN is a long short-term memory (abbreviated LSTM) network. In another implementation, the RNN is a gated recurrent unit (abbreviated GRU) network. In yet another implementation, the RNN is a quasi-recurrent neural network (abbreviated QRNN).

In one implementation of the system, the training set and the validation set are part of a single data set that is subjected to held-out splitting to create the training set and the validation set. Each of the candidate neural network-based classifiers in the pool is trained separately on the training set. The machine classification task is sentiment classification and the inputs are sentence. The task class labels are positive sentiment and negative sentiment.

The confusion matrix identifies at least one of (1) validation inputs accurately classified by both the particular trained recurrent neural network-based classifier and the particular trained non-recurrent neural network-based classifier, (2) validation inputs inaccurately classified by both the particular trained recurrent neural network-based classifier and the particular trained non-recurrent neural network-based classifier, (3) validation inputs accurately classified by the particular trained non-recurrent neural network-based classifier but inaccurately classified by the particular trained recurrent neural network-based classifier, and (4) validation inputs accurately classified by the particular trained recurrent neural network-based classifier but inaccurately classified by the particular trained non-recurrent neural network-based classifier.

In such an implementation of the system, first subset includes validation inputs accurately classified by the particular trained recurrent neural network-based classifier but inaccurately classified by the particular trained non-recurrent neural network-based classifier. The second subset includes at least one of: validation inputs accurately classified by both the particular trained recurrent neural network-based classifier and the particular trained non-recurrent neural network-based classifier; validation inputs inaccurately classified by both the particular trained recurrent neural network-based classifier and the particular trained non-recurrent neural network-based classifier; and validation inputs accurately classified by the particular trained non-recurrent neural network-based classifier but inaccurately classified by the particular trained recurrent neural network-based classifier.

The particular trained recurrent neural network-based classifier and the particular trained non-recurrent neural network-based classifier selected by the trained neural network-based decision classifier during inference are trained on a combination of the training set and the validation set, e trained $LSTM^{100\%}$ and $BoW^{100\%}$. The neural network-based decision classifier comprises the particular trained non-recurrent neural network-based classifier trained on the training set, with an original classification layer ablated. It includes one or more new fully-connected layers, and a new classification layer that produces output probabilities for the first and second model class labels. During training of the neural network-based decision classifier, only gradients for the fully-connected layers and the new classification layer are backpropagated and weights of the particular trained non-recurrent neural network-based classifier are kept fixed. In one implementation, the particular trained non-recurrent neural network-based classifier is at least one bag of words (abbreviated BoW) network.

Examples of some machine classification tasks that can be performed by the technology disclosed include speech recognition, machine translation, text summarization, question answering, image captioning, and text-to-speech (TTS) synthesis.

A second system implementation of the technology disclosed includes a neural network-based decision system with processors operating in parallel. The neural network-based decision system efficiently performs a sentiment classification task on a sentence using either a trained recurrent long short-term memory (abbreviated LSTM) network or a trained bag of words (abbreviated BoW) network that generates a mean vector representation of a sentence by averaging token vector embeddings of the sentence. The system generates a confusion matrix based on the trained LSTM and BoW networks' evaluation of validation sentences annotated with positive and negative sentiment labels. The system uses the confusion matrix to identify a subset of validation sentences accurately classified only by the trained LSTM network. The system then annotates the subset of validation sentences with a first model label identifying the trained LSTM network and annotates remaining of the validation sentences with a second model label identifying the trained BoW network. The system stores the model-annotated validation sentences in a decision set. The system constructs a decision system using the trained BoW network and trains the decision system using the decision set to produce an output that specifies whether to use the trained LSTM network or the trained BoW network for classifying the sentence's sentiment.

The second system implementation and other systems disclosed optionally include one or more of the following features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

During inference, the system uses an output of the trained decision system to select either the trained LSTM network or the trained BoW network to classify a sentence's sentiment. The decision system selects the trained LSTM network when the sentence is a linguistically complex sentence. The decision system selects the trained BoW network when the sentence is a linguistically simple sentence.

Each of the features discussed in this particular implementation section for the first system implementation apply equally to the second system implementation. As indicated above, all the system features are not repeated here and should be considered repeated by reference.

Other implementations may include a non-transitory computer readable storage medium storing instructions executable by a processor to perform functions of the system described above. Yet another implementation may include a method performing the functions of the system described above.

A third system implementation of the technology disclosed includes a system with processors operating in parallel. The system comprises a third neural network-based classifier that selects, on an input-by-input basis, between first and second neural network-based classifiers trained to perform a classification task. The selection is governed by the third neural network-based classifier's training on a training set annotated with class labels that distinguish between inputs accurately classified only by the trained second neural network-based classifier and remaining inputs in the training set.

The third system implementation and other systems disclosed optionally include one or more of the following features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

The remaining inputs include inputs inaccurately classified by the trained second neural network-based classifier and inputs accurately classified by both the trained first and second neural network-based classifiers.

Each of the features discussed in this particular implementation section for the first and the second system implementations apply equally to the third system implementation. As indicated above, all the system features are not repeated here and should be considered repeated by reference.

Other implementations may include a non-transitory computer readable storage medium storing instructions executable by a processor to perform functions of the system described above. Yet another implementation may include a method performing the functions of the system described above.

A first method implementation of the technology disclosed includes selecting, on an input-by-input basis, a neural network-based classifier from a pool of candidate neural network-based classifiers to perform a machine classification task in a manner that maximizes accuracy and minimizes computational cost. The method includes, training the candidate neural network-based classifiers in the pool to perform the machine classification task using a training set, the training set comprising training inputs annotated with task class labels defined for the machine classification task. Following this, the method includes using the trained candidate neural network-based classifiers to perform the machine classification task on a validation set, the validation set comprises validation inputs annotated with the task class labels. The method includes generating a confusion matrix based on the trained neural network-based classifiers' performance. The confusion matrix is used to identify a first subset of validation inputs accurately inferred only by a particular trained recurrent neural network-based classifier in the pool and a second subset of validation inputs comprising validation inputs not in the first subset. Following this, the method includes labeling the validation inputs in the first subset with a first model class label identifying the particular trained recurrent neural network-based classifier. The method also includes labeling the validation inputs in the second subset with a second model class label identifying a particular trained non-recurrent neural network-based classifier in the pool. Following this, the method includes, storing the model-class-labeled validation inputs in the first and second subsets as a decision set. Finally, the method includes, training a neural network-based decision classifier using the decision set to output probabilities for the first and second model class labels on an input-by-input basis. The output probabilities specify respective likelihoods of selecting the particular trained recurrent neural network-based classifier and the particular trained non-recurrent neural network-based classifier.

Each of the features discussed in this particular implementation section for the first system implementation apply equally to this method implementation. As indicated above, all the system features are not repeated here and should be considered repeated by reference.

Other implementations may include a non-transitory computer readable storage medium storing instructions executable by a processor to perform the first method described above. Yet another implementation may include a system including memory and one or more processors operable to execute instructions, stored in the memory, to perform the first method described above.

Computer readable media (CRM) implementations of the technology disclosed include a non-transitory computer readable storage medium impressed with computer program instructions, when executed on a processor, implement the method described above.

Each of the features discussed in this particular implementation section for the first system implementation apply equally to the CRM implementation. As indicated above, all the system features are not repeated here and should be considered repeated by reference.

A second method implementation of the technology disclosed includes efficiently performing a sentiment classification task on a sentence using either a trained recurrent long short-term memory (abbreviated LSTM) network or a trained bag of words (abbreviated BoW) network that generates a mean vector representation of a sentence by averaging token vector embeddings of the sentence. The method includes generating a confusion matrix based on the trained LSTM and BoW networks' evaluation of validation sentences annotated with positive and negative sentiment labels. Following this, the method includes, using the confusion matrix to identify a subset of validation sentences accurately classified only by the trained LSTM network and annotating the subset of validation sentences with a first model label identifying the trained LSTM network and annotating remaining of the validation sentences with a second model label identifying the trained BoW network. Then the method includes, storing the model-annotated validation sentences in a decision set. Finally, the method includes, constructing a decision system using the trained BoW network and training the decision system using the decision set to produce an output that specifies whether to use the trained LSTM network or the trained BoW network for classifying the sentence's sentiment.

Each of the features discussed in this particular implementation section for the second system implementation apply equally to this method implementation. As indicated above, all the system features are not repeated here and should be considered repeated by reference.

Other implementations may include a non-transitory computer readable storage medium storing instructions executable by a processor to perform the second method described above. Yet another implementation may include a system including memory and one or more processors operable to execute instructions, stored in the memory, to perform the second method described above.

Computer readable media (CRM) implementations of the technology disclosed include a non-transitory computer readable storage medium impressed with computer program instructions, when executed on a processor, implement the method described above.

Each of the features discussed in this particular implementation section for the second system implementation apply equally to the CRM implementation. As indicated above, all the system features are not repeated here and should be considered repeated by reference.

A third method implementation of the technology disclosed includes selecting using a third neural network-based classifier, on an input-by-input basis, between first and second neural network-based classifiers trained to perform a classification task. The selection governed by the third neural network-based classifier's training on a training set annotated with class labels that distinguish between inputs accurately classified only by the trained second neural network-based classifier and remaining inputs in the training set.

Each of the features discussed in this particular implementation section for the third system implementation apply equally to this method implementation. As indicated above, all the system features are not repeated here and should be considered repeated by reference.

Other implementations may include a non-transitory computer readable storage medium storing instructions executable by a processor to perform the third method described above. Yet another implementation may include a system including memory and one or more processors operable to execute instructions, stored in the memory, to perform the third method described above.

Computer readable media (CRM) implementations of the technology disclosed include a non-transitory computer readable storage medium impressed with computer program instructions, when executed on a processor, implement the method described above.

Each of the features discussed in this particular implementation section for the third system implementation apply equally to the CRM implementation. As indicated above, all the system features are not repeated here and should be considered repeated by reference.

What is claimed is:

1. A system for performing a selection task using a decision neural network-based classifier, comprising: a memory storing a plurality of processor-executable instructions for training and operating the decision neural network-based classifier; and a processor that reads the plurality of processor-executable instructions from the memory to perform operations comprising: constructing a decision training set for the decision neural network-based classifier by: identifying, based on a confusion matrix generated from performance of a non-recurrent network-based classifier and a recurrent neural network-based classifier, a first subset of inputs inferred by the recurrent neural network-based classifier and a second subset of inputs comprising inputs not in the first subset, and including, in the decision training set, the first subset of inputs labeled with a first model class label identifying the recurrent neural network-based classifier and the second subset of inputs labeled with a second model class label identifying the non-recurrent neural network-based classifier; generating, by the decision neural network based classifier, a plurality of selection outputs in response to inputs from the decision training set; computing a training objective by comparing the plurality of selection outputs with labels from the first subset and the second subset; and updating the decision neural network based classifier based on the training objective wherein the operations further comprise: training the non-recurrent and recurrent neural network-based classifiers to perform the machine classification task using a training set, the training set comprising training inputs annotated with task class labels defined for the machine classification task; using the trained non-recurrent and recurrent neural network-based classifiers to perform the machine classification task on a validation set, the validation set comprising validation inputs annotated with the task class labels; and training the decision neural network-based classifier using the decision training set to output probabilities for the first and second model class labels on an input-by-input basis, the output probabilities specifying respective likelihoods of selecting the trained recurrent neural network-based classifier and the trained non-recurrent neural network-based classifier.

2. The system of claim 1, wherein the operations further comprise: at an inference stage, selecting, by the decision neural network-based classifier, on an input-by-input basis, between the non-recurrent neural network-based classifier and the recurrent neural network-based classifier to perform a machine classification task; and based on output probabilities of the trained decision neural network-based classifier, performing the machine classification task on the given input using either the trained recurrent neural network-based classifier or the trained non-recurrent neural network-based classifier.

3. The system of claim 2, wherein the operation further comprise: selecting the trained recurrent neural network-based classifier when an output probability associated with the first model class label is higher than that of the second model class label; or selecting the trained non-recurrent neural network-based classifier when an output probability associated with the second model class label is higher than that of the first model class label.

4. The system of claim 1, wherein the non-recurrent network-based classifier and the recurrent neural network-based classifier are separately trained on the decision training set.

5. The system of claim 1, wherein the decision training set comprises a plurality of sentences annotated with a sentiment label.

6. The system of claim 1, wherein the confusion matrix identifies at least one of: validation inputs accurately classified by both the trained recurrent neural network-based classifier and the trained non-recurrent neural network-based classifier; validation inputs inaccurately classified by both the trained recurrent neural network-based classifier and the trained non-recurrent neural network-based classifier; validation inputs accurately classified by the trained non-recurrent neural network-based classifier but inaccurately classified by the trained recurrent neural network-based classifier; and validation inputs accurately classified by the trained recurrent neural network-based classifier but inaccurately classified by the trained non-recurrent neural network-based classifier.

7. The system of claim 1, wherein the first subset includes validation inputs accurately classified by the trained recurrent neural network-based classifier but inaccurately classified by the trained non-recurrent neural network-based classifier.

8. The system of claim 1, wherein the second subset includes at least one of: validation inputs accurately classified by both the trained recurrent neural network-based classifier and the trained non-recurrent neural network-based classifier; validation inputs inaccurately classified by both the trained recurrent neural network-based classifier and the trained non-recurrent neural network-based classifier; and validation inputs accurately classified by the trained non-recurrent neural network-based classifier but inaccurately classified by the trained recurrent neural network-based classifier.

9. The system of claim 1, wherein an operation of updating the decision neural network based classifier comprises: backpropagating gradients only for fully-connected layers and a new classification layer while keeping weights of the trained non-recurrent neural network-based classifier fixed.

10. A method for performing a selection task using a decision neural network-based classifier, the method comprising: constructing a decision training set for the decision neural network-based classifier by: identifying, based on a confusion matrix generated from performance of a non-recurrent network-based classifier and a recurrent neural network-based classifier, a first subset of inputs inferred by the recurrent neural network-based classifier and a second subset of inputs comprising inputs not in the first subset, and including, in the decision training set, the first subset of inputs labeled with a first model class label identifying the recurrent neural network-based classifier and the second subset of inputs labeled with a second model class label identifying the non-recurrent neural network-based classifier; generating, by the decision neural network based classifier, a plurality of selection outputs in response to inputs from the decision training set; computing a training objective by comparing the plurality of selection outputs with labels from the first subset and the second subset; and updating the decision neural network based classifier based on the training objective; training the non-recurrent and recurrent neural network-based classifiers to perform the machine classification task using a training set, the training set comprising training inputs annotated with task class labels defined for the machine classification task; using the trained non-recurrent and recurrent neural network-based classifiers to perform the machine classification task on a validation set, the validation set comprising validation inputs annotated with the task class labels; and training the decision neural network-based classifier using the decision training set to output probabilities for the first and second model class labels on an input-by-input basis, the output probabilities specifying respective likelihoods of selecting the trained recurrent neural network-based classifier and the trained non-recurrent neural network-based classifier.

11. The method of claim 10, further comprising: at an inference stage, selecting, by the decision neural network-based classifier, on an input-by-input basis, between the non-recurrent neural network-based classifier and the recurrent neural network-based classifier to perform a machine classification task; and based on output probabilities of the trained decision neural network-based classifier, performing the machine classification task on the given input using either the trained recurrent neural network-based classifier or the trained non-recurrent neural network-based classifier.

12. The method of claim 11, further comprising: selecting the trained recurrent neural network-based classifier when an output probability associated with the first model class label is higher than that of the second model class label; or selecting the trained non-recurrent neural network-based classifier when an output probability associated with the second model class label is higher than that of the first model class label.

13. The method of claim 10, wherein the non-recurrent network-based classifier and the recurrent neural network-based classifier are separately trained on the decision training set.

14. The method of claim 10, wherein the decision training set comprises a plurality of sentences annotated with a sentiment label.

15. The method of claim 10, wherein the confusion matrix identifies at least one of: validation inputs accurately classified by both the trained recurrent neural network-based classifier and the trained non-recurrent neural network-based classifier; validation inputs inaccurately classified by both the trained recurrent neural network-based classifier and the trained non-recurrent neural network-based classifier; validation inputs accurately classified by the trained non-recurrent neural network-based classifier but inaccurately classified by the trained recurrent neural network-based classifier validation inputs accurately classified by the trained recurrent neural network-based classifier but inaccurately classified by the trained non-recurrent neural network-based classifier.

16. The method of claim 10, wherein the first subset includes validation inputs accurately classified by the trained recurrent neural network-based classifier but inaccurately classified by the trained non-recurrent neural network-based classifier, and the second subset includes at least one of: validation inputs accurately classified by both the trained recurrent neural network-based classifier and the trained non-recurrent neural network-based classifier; validation inputs inaccurately classified by both the trained recurrent neural network-based classifier and the trained non-recurrent neural network-based classifier; and validation inputs accurately classified by the trained non-recurrent neural network-based classifier but inaccurately classified by the trained recurrent neural network-based classifier.

17. The method of claim 10, wherein updating the decision neural network based classifier comprises: backpropagating gradients only for fully-connected layers and a new classification layer while keeping weights of the trained non-recurrent neural network-based classifier fixed.

18. A non-transitory processor-readable storage medium storing a plurality of processor-executable instructions for performing a selection task using a decision neural network-based classifier, the instructions being executed by a processor to perform operations comprising: constructing a decision training set for the decision neural network-based classifier by: identifying, based on a confusion matrix generated from performance of a non-recurrent network-based classifier and a recurrent neural network-based classifier, a first subset of inputs inferred by the recurrent neural network-based classifier and a second subset of inputs comprising inputs not in the first subset, and including, in the decision training set, the first subset of inputs labeled with a first model class label identifying the recurrent neural network-based classifier and the second subset of inputs labeled with a second model class label identifying the non-recurrent neural network-based classifier; generating, by the decision neural network based classifier, a plurality of selection outputs in response to inputs from the decision training set; computing a training objective by comparing the plurality of selection outputs with labels from the first subset and the second subset; and updating the decision neural network based classifier based on the training objective; training the non-recurrent and recurrent neural network-based classifiers to perform the machine classification task using a training set, the training set comprising training inputs annotated with task class labels defined for the machine classification task; using the trained non-recurrent and recurrent neural network-based classifiers to perform the machine classification task on a validation set, the validation set comprising validation inputs annotated with the task class labels; and training the decision neural network-based classifier using the decision training set to output probabilities for the first and second model class labels on an input-by-input basis, the output probabilities specifying respective likelihoods of selecting the trained recurrent neural network-based classifier and the trained non-recurrent neural network-based classifier.

\* \* \* \* \*